(12) United States Patent
Jagels

(10) Patent No.: US 8,972,583 B2
(45) Date of Patent: Mar. 3, 2015

(54) SESSION-REUSE IN NETWORKS

(75) Inventor: Dean P. Jagels, Lawrenceville, GA (US)

(73) Assignee: Cisco Technology Inc., San Jose, CA (US)

( * ) Notice: Subject to any disclaimer, the term of this patent is extended or adjusted under 35 U.S.C. 154(b) by 1370 days.

(21) Appl. No.: 11/858,936

(22) Filed: Sep. 21, 2007

(65) Prior Publication Data
US 2008/0046572 A1 Feb. 21, 2008

Related U.S. Application Data

(63) Continuation of application No. 10/102,250, filed on Mar. 20, 2002, now Pat. No. 7,296,074.

(51) Int. Cl.
*G06F 15/16* (2006.01)
*H04L 29/06* (2006.01)
*H04L 29/08* (2006.01)

(52) U.S. Cl.
CPC ...... *H04L 65/4084* (2013.01); *H04L 29/06027* (2013.01); *H04L 67/14* (2013.01); *H04L 69/329* (2013.01)
USPC .......................................... 709/227; 709/228

(58) Field of Classification Search
None
See application file for complete search history.

(56) References Cited

U.S. PATENT DOCUMENTS

| | | | |
|---|---|---|---|
| 5,768,419 A * | 6/1998 | Gundlach et al. ................. | 726/5 |
| 5,812,668 A | 9/1998 | Weber | |
| 5,911,044 A * | 6/1999 | Lo et al. ......................... | 709/203 |
| 5,987,140 A | 11/1999 | Rowney et al. | |
| 6,166,730 A * | 12/2000 | Goode et al. ................... | 715/716 |
| 6,317,584 B1 | 11/2001 | Abu-Amara et al. | |
| 6,338,089 B1 * | 1/2002 | Quinlan ......................... | 709/227 |
| 6,411,986 B1 * | 6/2002 | Susai et al. ..................... | 709/203 |
| 6,519,643 B1 * | 2/2003 | Foulkes et al. ................. | 709/227 |
| 6,922,689 B2 * | 7/2005 | Shtivelman ......................... | 707/3 |
| 7,010,801 B1 * | 3/2006 | Jerding et al. ................... | 725/95 |
| 7,451,475 B1 * | 11/2008 | Oz et al. ......................... | 725/127 |
| 7,496,945 B2 * | 2/2009 | Rodriguez ....................... | 725/51 |
| 7,992,163 B1 * | 8/2011 | Jerding et al. ................... | 725/28 |
| 2003/0005447 A1 * | 1/2003 | Rodriguez ....................... | 725/51 |
| 2003/0023742 A1 | 1/2003 | Allen et al. | |
| 2004/0095920 A1 * | 5/2004 | Lippman et al. .............. | 370/351 |

OTHER PUBLICATIONS

Manohar, Nelson R. and Prakash, Atul, "A Flexible Architecture for Heterogeneous Replayable Workspaces," Jun. 1996, IEEE, pp. 274-278.
Cao, X. G. and Tagg, A. G., "Sharing User-Network Interfaces between Networked Multimedia Applications", Mar. 1994, IEEE, pp. 10A/1-10A/8.
ISO/IEC 13818-6: 1998, "Information Technology—Generic Coding of Moving Pictures and Associated Audio Information", Part 6: Extensions of DSM-CC, Chapter 4, pp. 19-104.
"Session Protocol" by Time Warner Cable, Version 1.0, Jun. 10, 1999.
Scientific-Atlanta, Inc. U.S. Appl. No. 09/590,518, filed Jun. 9, 2000, Title: "Catalog Management System for Video on Demand System," Inventors: Dean F. Jerding, Shashi Goal, and Nihar Dave.

* cited by examiner

*Primary Examiner* — Azizul Choudhury

(57) ABSTRACT

Systems and methods for establishing a first session with a first client device to deliver first content, receiving a request for a second session with a second client device to deliver second content, and re-using the first session for the second session.

20 Claims, 12 Drawing Sheets

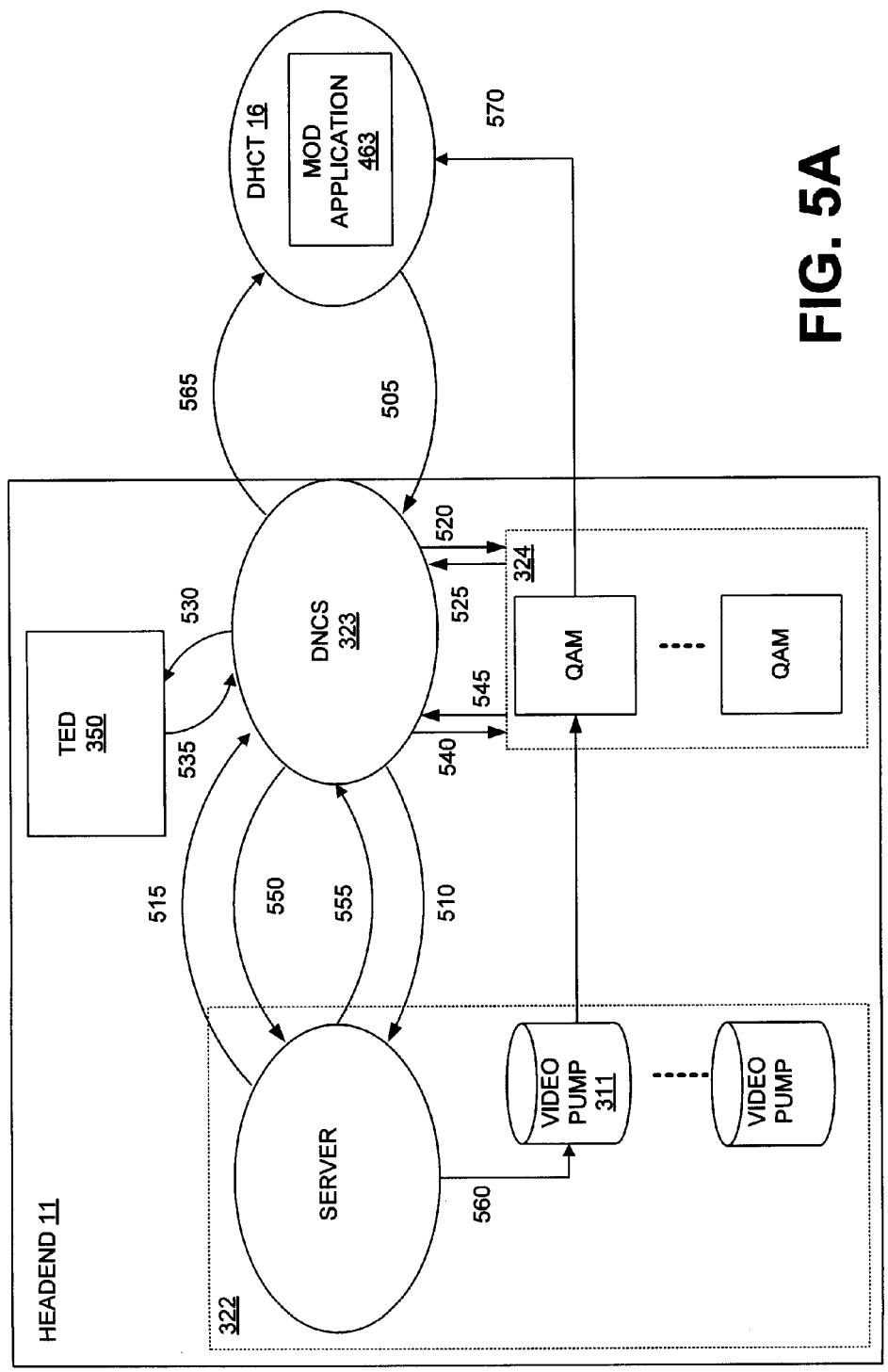

SESSION-REUSE IN NETWORKS

CROSS-REFERENCE TO RELATED APPLICATION

This application is a continuation of U.S. utility application entitled, "Media On Demand Session Re-Use," having Ser. No. 10/102,250, filed Mar. 20, 2002 now U.S. Pat. No. 7,296,074, which is entirely incorporated herein by reference.

FIELD OF THE INVENTION

This invention relates in general to session-based media content delivery.

BACKGROUND OF THE INVENTION

With recent advances in digital transmission technology, subscriber television systems are now capable of providing much more than traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand (VOD).

Typically, a DHCT is connected to a cable or satellite, or generally, a subscriber television system, and includes hardware and software necessary to provide the functionality of the digital television system at the user's site. Some of the software executed by a DHCT can be downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

Two-way digital services, such as VOD, often require the establishment of network resources (i.e., the allocation of hardware and/or software components and setting of the component parameters) to enable the delivery of media content (e.g., VOD movies) to a requesting DHCT subscriber, and the "tearing down" of these resources (i.e., the release of the components to enable further resource establishment) when, for example, the media content presentation has ended. The establishment of network resources for the delivery of media content defines the beginning of a session. Session setup and release are typically costly and/or time consuming insofar as they can require frequent communication between various subscriber television system hardware and/or software components.

Thus, a heretofore unaddressed need exists in the industry to address the aforementioned deficiencies and inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5A is a flow diagram that illustrates the signaling interactions between the DHCT, a digital network control system (DNCS), and a video-on-demand (VOD) content server to set up a VOD session, in accordance with one embodiment of the invention.

DETAILED DESCRIPTION OF THE PREFERRED EMBODIMENTS

Figure 6A:
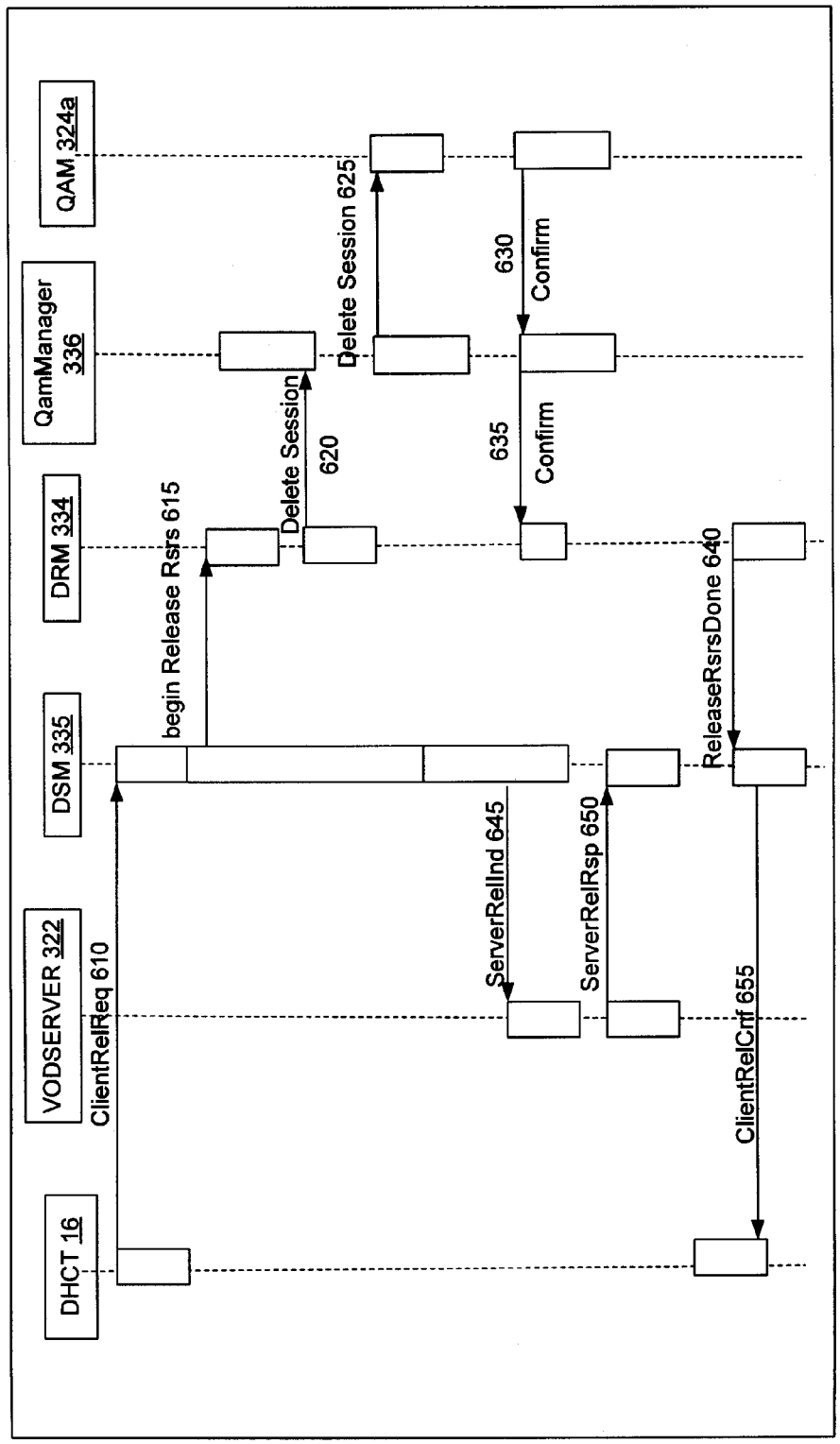
FIG. 6A is a timing diagram depicting the procedure for tearing down a session using the client initiated session release scenario, in accordance with one embodiment of the invention.
Figure 6B:
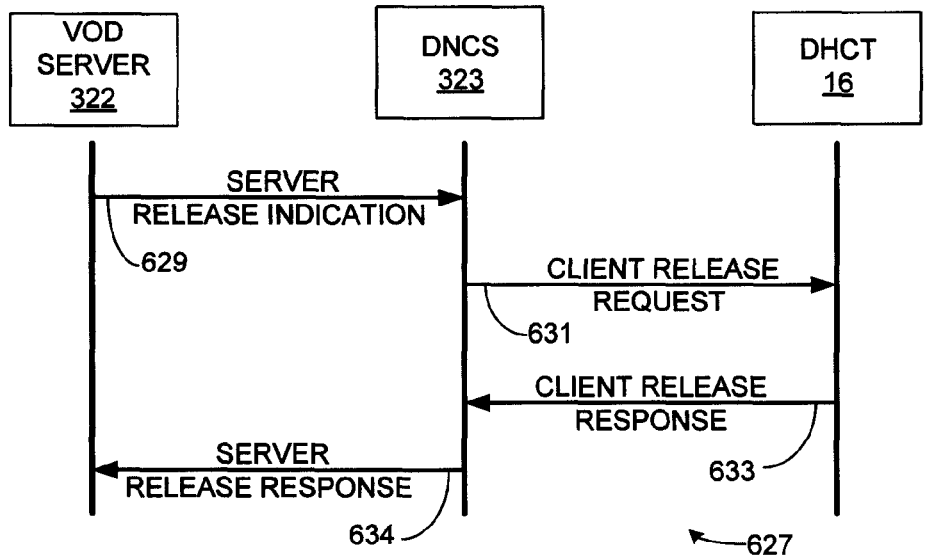
FIG. 6B is a timing diagram depicting the procedure for tearing down a session using a VOD content server initiated session release scenario, in accordance with one embodiment of the invention.
Figure 6C:
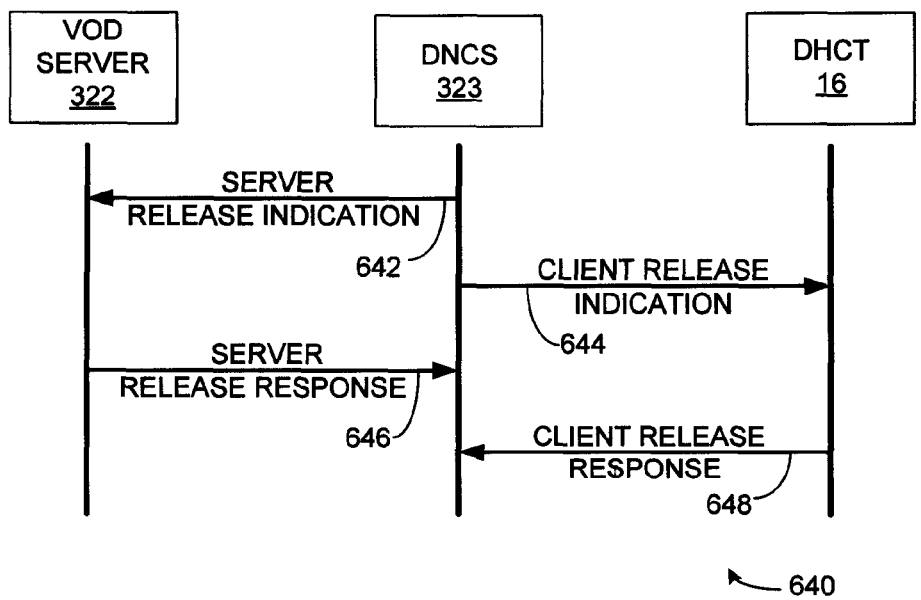
FIG. 6C is a timing diagram depicting the procedure for tearing down a session using a DNCS initiated session tear down, in accordance with one embodiment of the invention.
Figure 7:
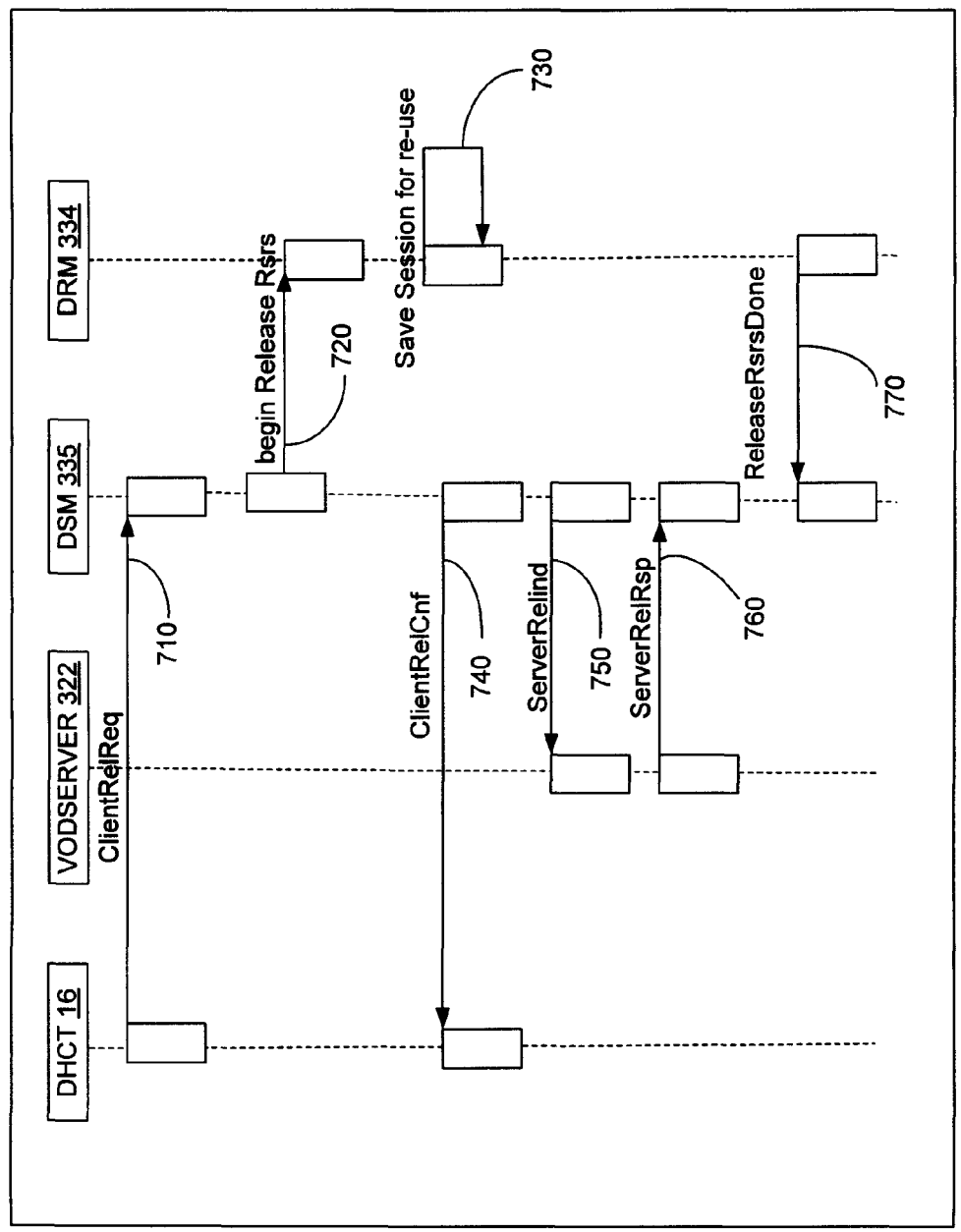
FIGS. 7 and 8 are timing diagrams that illustrate the signaling interactions between the DHCT, DNCS components, and the VOD content server, to re-use a VOD session, in accordance with one embodiment of the invention.
Figure 8:
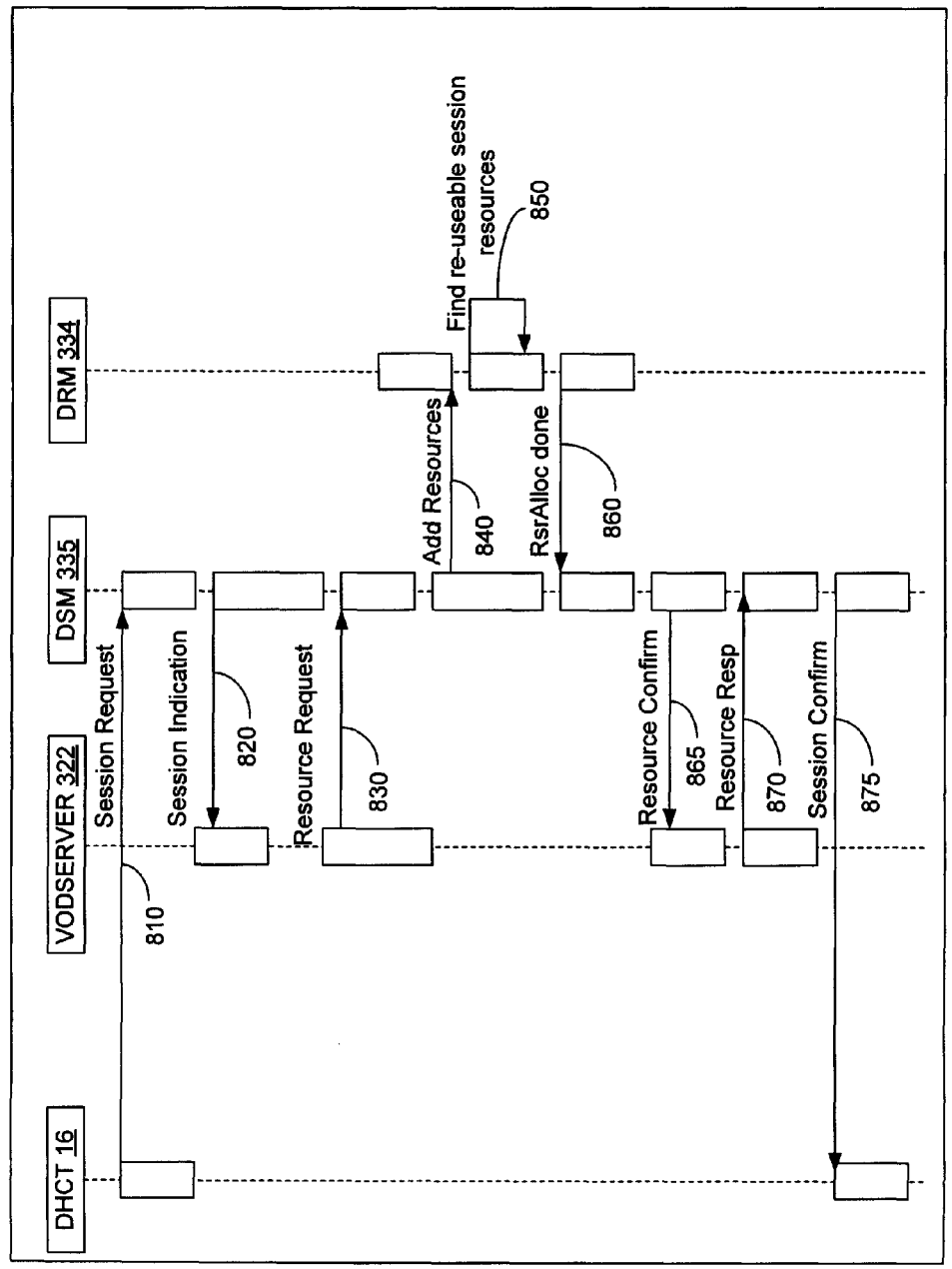
Figure 9:
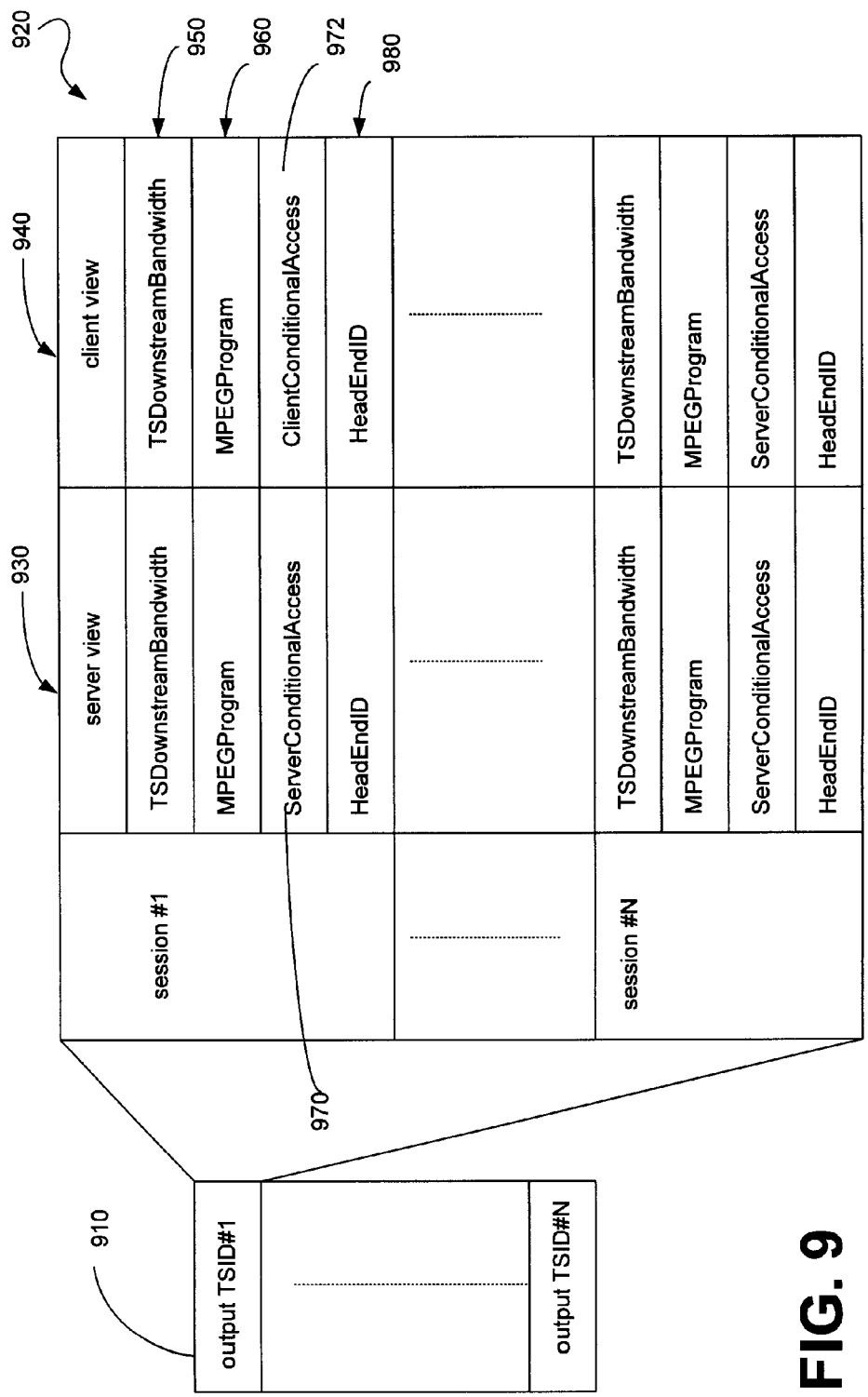
FIG. 9 is a block diagram illustrating partial views of a table of transport stream ID's and a session table, in accordance with one embodiment of the invention.

The preferred embodiments of the invention now will be described more fully hereinafter with reference to the accompanying drawings, in which preferred embodiments of the invention are shown. In particular, the preferred embodiments include a mechanism for re-using sessions, which will be described in the context of on-demand media content delivery in a subscriber television system. By re-using sessions, hardware and/or software interactions that are typically integral to terminating and creating sessions for the delivery of media content are reduced, providing for an efficient utilization of network resources and reduced latency in the delivery of media content. FIGS. 1-4 illustrate an example subscriber television system architecture that would benefit from re-using sessions. FIGS. 5-6 describe general signaling interactions that occur within the subscriber television system to deliver on-demand media content. FIGS. 7-9 illustrate the signaling interactions between resources to re-use sessions.

It will be understood, within the context of the below description, that re-using sessions is not limited to implementations that are connection oriented, and that non-connection oriented media content delivery is also within the scope of the preferred embodiments. This invention may be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many examples contemplated but not shown.

Figure 1:
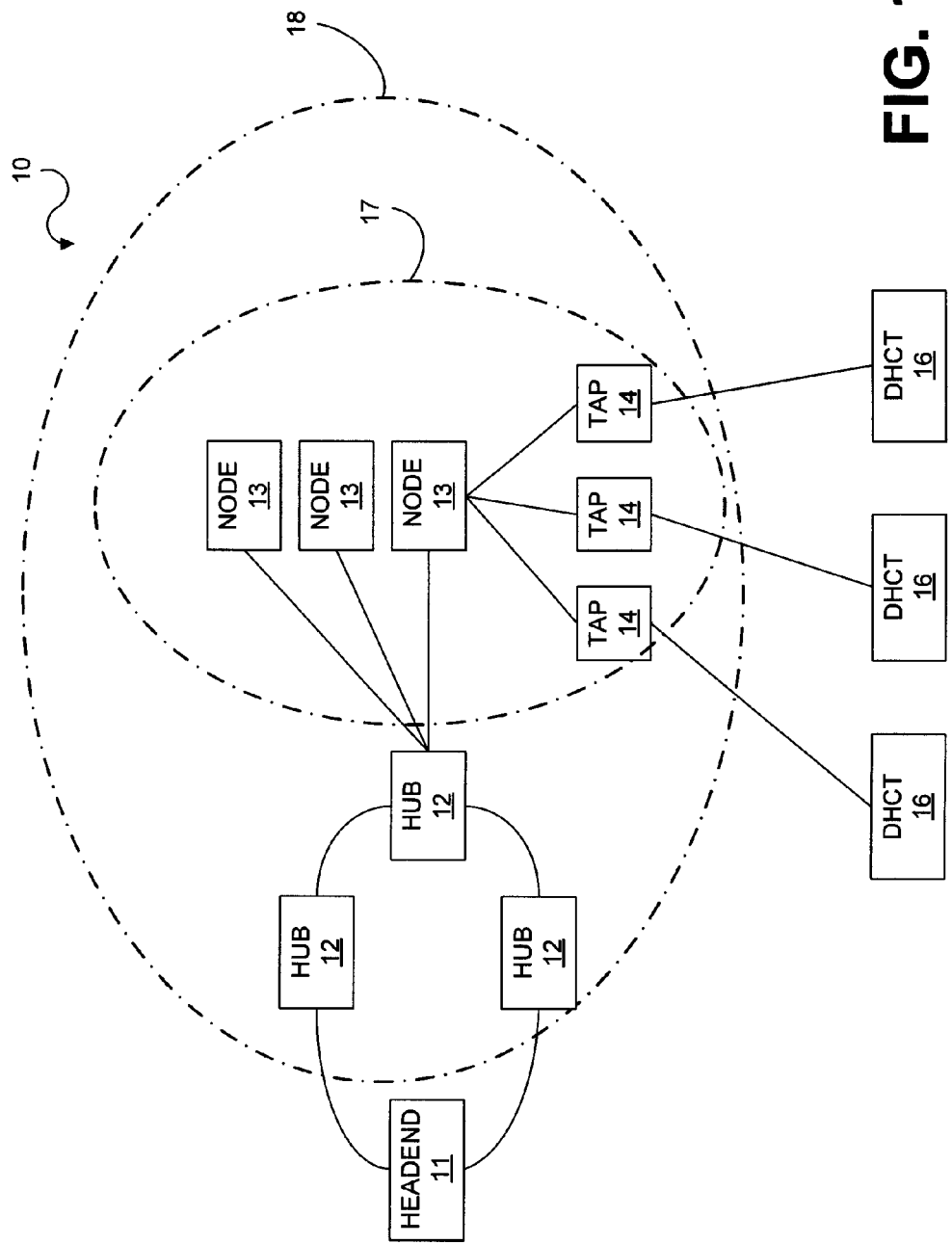
FIG. 1 is a block diagram of a non-limiting example subscriber television system (STS), in accordance with one embodiment of the invention.

One embodiment of the invention is generally implemented as part of a subscriber television system (STS), which includes digital broadband delivery systems (DBDS) and cable television systems (CTS). As a non-limiting example, a subscriber television system (STS) and its operation will be described initially, with the understanding that other conventional data delivery systems are within the scope of the preferred embodiments of the invention. FIG. 1 shows a block diagram view of an STS 10, which is generally a high quality, reliable and integrated network system that is typically capable of delivering video, audio, voice and data services to digital home communication terminals (DHCTs) 16. Although FIG. 1 depicts a high level view of an STS 10, it should be appreciated that a plurality of subscriber television systems can tie together a plurality of regional networks into an integrated global network so that DHCT users can receive media content provided from anywhere in the world. Further, it will be appreciated that the STS 10 shown in FIG. 1 is merely illustrative and should not be construed as implying any limitations upon the scope of the preferred embodiments of the invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, Hybrid Fiber/Coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 typically delivers broadcast video signals as digitally formatted signals in addition to delivering traditional broadcast analog video signals. Furthermore, the system can typically support one way broadcast services as well as both one-way data services and two-way media content and data services. The two-way operation of the network typically allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1, a typical STS 10 comprises a headend 11, hubs 12, an HFC access network 17, nodes 13, taps 14, and DHCTs 16. It should be appreciated that although a single component (e.g., a headend) is illustrated in FIG. 1, the STS 10 can feature a plurality of any one of the illustrated components, can omit components, or may be configured with alternative embodiments for any one of the individual components or with yet other additional components not enumerated above.

Media content provided by one or more content providers (not shown) is communicated by the content providers to one or more headends 11. From those headends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14, which is preferably connected to a digital home communication terminal (DHCT) 16. Coaxial cables are typically used to couple nodes 13 and taps 14 because the electrical signals can be easily repeated with RF amplifiers. As the high-level operations of many of the functions of an STS 10 are well known to those of ordinary skill in the art, further high level description of the overall STS 10 of FIG. 1 will not be contained herein.

Figure 2:
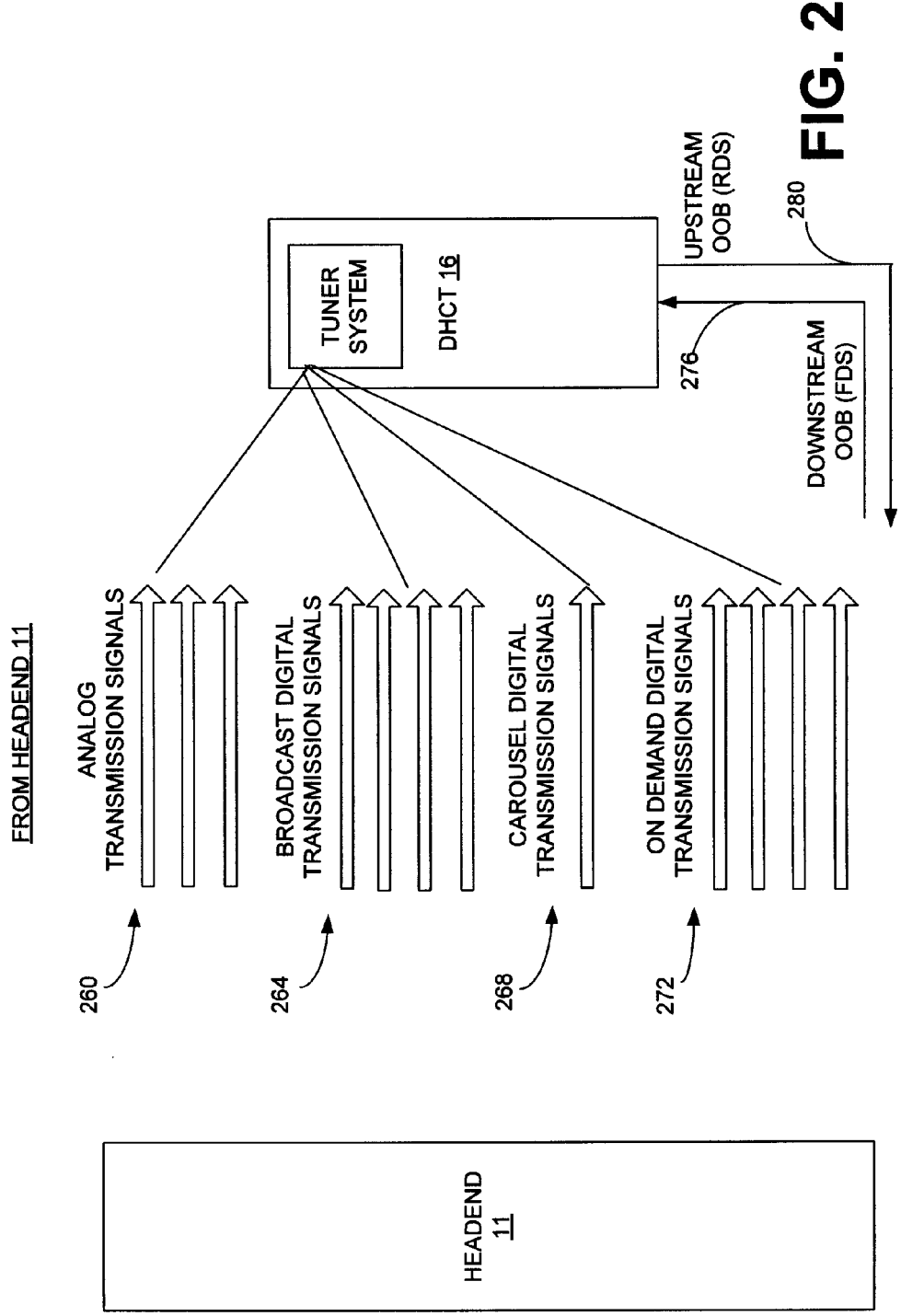
FIG. 2 is a block diagram illustration of the transmission signals supported by the STS of FIG. 1, and input into a digital home communication terminal (DHCT) from a headend, in accordance with one embodiment of the invention.

FIG. 2 is a block diagram illustrating the transmission signals supported by the STS 10 (FIG. 1), where the transmission signals 260, 264, 268, 272 and 276 are input into the DHCT 16 in accordance with one embodiment of the invention. One or more content providers (not shown) are the source of the information that is included in the transmission signals. Before passing through the network 17 (FIG. 1), transmission signals can be generated at a headend 11 or at a hub 12 (FIG. 1) that might function as a mini-headend and which therefore possesses some of the headend functionality.

As depicted in FIG. 2, the STS 10 (FIG. 1) can simultaneously support a number of transmission signal types, transmission rates, and modulation formats. The ability to carry analog and digital signals over a large bandwidth are characteristics of an HFC network typically employed in an STS, as in the STS 10 of FIG. 1. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, an STS 10 using HFC supports downstream (i.e., in the direction from the headend 11 to the DHCT 16) frequencies from 50 mega-hertz (MHz) to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the United States (U.S.), a possible downstream RF spectrum subdivision plan uses 6 MHz frequency subdivisions, or spans, within the 50 MHz to 550 MHz band for analog video transmission signals and within the 550 MHz to 870 MHz range for digital transmission signals.

Analog transmission signals (ATSs) 260 shown in FIG. 2 are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio. Referring again to FIG. 2, the downstream direction transmission signals, having been multiplexed, and in one embodiment using FDM, are often referred to as in-band transmission signals and include Analog Transmission Signals (ATSs) 260 and Digital Transmission Signals (DTSs) 264, 268, 272 (also known as Digital Transport Signals). These transmission signals carry video, audio, and data services. For example, these transmission signals may carry television signals, Internet data, or any additional types of data, such as Electronic Program Guide (EPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 260, the DTSs 264, 268, 272 each typically occupies 6 MHz of the RF spectrum. However, the DTSs 264, 268, 272 are digital transmission signals consisting of 64- or 256-Quadrature Amplitude Modulated (QAM) digital signals preferably formatted using Moving Picture Experts Group (MPEG) standards such as MPEG-2 transport streams, allocated in a separate frequency range. The MPEG-2 transport stream enables transmission of a plurality of DTS types over each 6 MHz RF subdivision, as compared to a 6 MHz ATS. The three types of digital transport signals illustrated in FIG. 2 include broadcast digital transmission signals 264, carousel digital transmission signals 268, and on-demand transmission signals 272.

MPEG-2 transport may be used to multiplex video, audio, and data in each of these DTSs. However, because an MPEG-2 transport stream allows for multiplexed video, audio, and data into the same stream, the DTSs do not necessarily have to be allocated in separate 6 MHz RF frequencies, unlike ATSs 260, in one embodiment. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal (DTS) can carry the video and audio streams of the media content instances of multiple television (TV) stations, as well as media content and data that is not necessarily related to those TV media content instances, as compared to one TV channel broadcast over one ATS 260 that consumes the entire 6 MHz. The digital data is inserted into MPEG transport streams carried through each 6 MHz frequency subdivision assigned for digital transmission, and then demultiplexed at the subscriber DHCT so that multiple sets of data can be produced within each tuned 6 MHz frequency span, or subdivision.

Although broadcast in nature, the carousel DTSs 268 and on-demand DTSs 272 offer different functionality. Continuing with FIG. 2, the broadcast DTSs 264 and carousel DTSs 268 typically function as continuous feeds for indefinite time, whereas the on-demand DTSs 272 are continuous feed sessions for a limited time. In one embodiment, all DTS types are capable of being transmitted at high data rates. The broadcast DTSs 264 carry typical data comprising multiple digitally-MPEG-2 compressed and formatted TV source signals and other continuously fed data information. The carousel DTSs 268 carry broadcast media content or data that is systematically broadcast in a cycling fashion but updated and revised as needed. Thus, the carousel DTSs 268 serve to carry high volume data such as media content and data and possibly, other data at high data rates. The carousel DTSs 268 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 272, on the other hand, can carry particular information such as compressed video and audio pertaining to subscriber requested media content instance preview and/or media content instance descriptions, as well as other specialized data information.

Preferably, the User-to-Network Download Protocol of the MPEG-2 standard's DSM-CC specification (Digital Storage Media-Command and Control) provides the data carousel protocol used for broadcasting data from a server located at headend 11, or elsewhere. It also provides the interactive download protocol for reliable downloading of data from a server (possibly the same server) to an individual DHCT through the on-demand DTSs. Each carousel and on-demand DTS is preferably defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 2 are Out-Of-Band (OOB) signals that provide continuously available two-way signaling to the subscribers' DHCT 16 regardless of which in-band signals are tuned to by the individual DHCT in-band tuners. The OOB signals consist of a Forward Data Signal (FDS) 276 and a Reverse Data Signal (RDS) 280. The OOB signals can comply to any one of a number of well known transport protocols but preferably comply to either a Digital Audio Visual Council (DAVIC) 1.1 Transport Protocol with an FDS of 1.544 mega-bits per second (Mbps) or more using quadrature phase shift keying (QPSK) modulation and an RDS of 1.544 Mbps or more using QPSK modulation, or to a Data Over Cable Service Interface Specification (DOCSIS) Transport Protocol with an FDS of 27 Mbps using 64-QAM modulation and an RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 3:
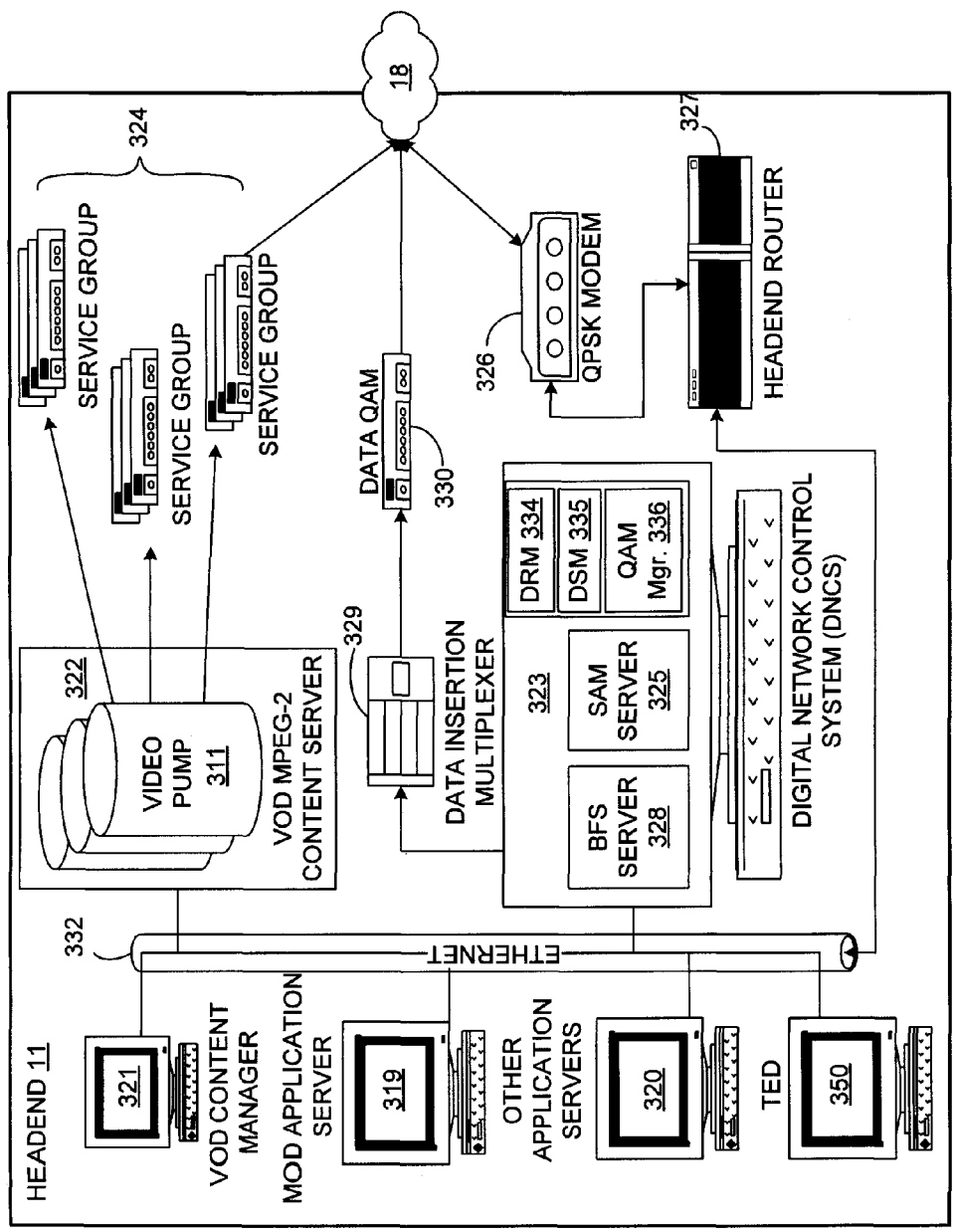
FIG. 3 is a block diagram of a non-limiting example headend as depicted in FIG. 1 and related equipment, in accordance with one embodiment of the invention.

FIG. 3 is a block diagram of portions of one example headend 11 that is configured to provide broadcast and media-on-demand (MOD) services, in accordance with one embodiment of the present invention. The overview of FIG. 3 is equally applicable to one example hub 12, and the same elements and principles may be implemented at a hub 12 instead of the headend 11 as described herein. It will be understood that the headend 11 shown in FIG. 3 is merely illustrative and should not be construed as implying any limitations upon the scope of the present invention. MOD services include, among other things, video-on-demand (VOD) services and respective MOD information suitable to be presented to a user, preferably via the display of an interactive media guide. The MOD server application 319 and a plurality of other server applications 320 are connected to a digital network control system (DNCS) 323 via a high-speed network such as an Ethernet connection 332. The MOD server application 319 is responsible for reserving and configuring system resources needed to provide MOD services and for providing configuration and service data to a MOD application 463 (FIG. 4), including MOD information comprising a catalog of media content titles corresponding to media content available for on-demand viewing and/or on-demand rental by a user. While video is primarily referenced herein as the media presented, it should be understood that various other types of media are also considered to be within the scope of the preferred embodiments.

Figure 4:
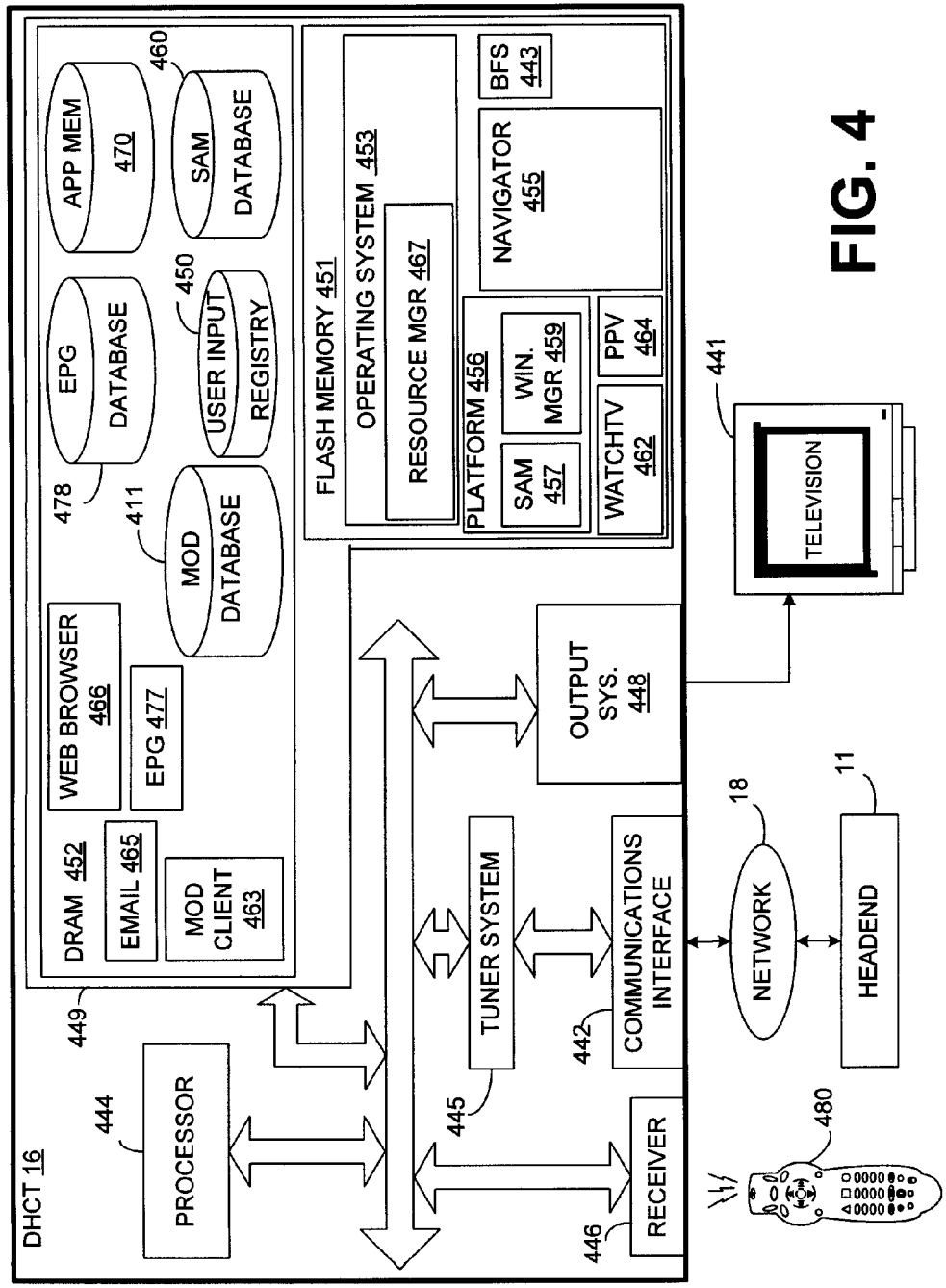
FIG. 4 is a block diagram of a non-limiting example DHCT as depicted in FIG. 1 and related equipment, in accordance with one embodiment of the invention.

The DNCS 323 provides management, monitoring, and control of the network's elements and broadcast services provided to users. In one implementation, the DNCS 323 uses a data insertion multiplexer 329 and a data QAM 330 to insert in-band broadcast file system (BFS) data into an MPEG-2 transport stream that is broadcast and received via DHCT's communication interface 442 (FIG. 4) and tuner system 445 (FIG. 4). The DNCS 323 also contains a session management functionality preferably implemented through the use of modules, including a digital resource manager (DRM) 334 and a digital session manager (DSM) 335 (as explained below), that preferably uses the Digital Storage Media Command and Control (DSM-CC) protocol to set up and maintain MOD sessions. These modules 334 and 335 preferably process user to network (U-N) session signaling messages, manage allocation of session-related network resources, support network management operations, act as a point of contact to the network for the DHCT's 16 in the network 18 to establish individual sessions, and support MOD services by providing the signaling interface to establish, maintain and release client initiated exclusive sessions. The session manager modules 334 and 335 also define a resource descriptor structure, which is used to request the network resources within a session. Resource descriptors are mechanisms to carry data, and are typically structured with a header and a payload comprising fields that carry information about sessions, for example, bit rate. In the preferred embodiments, the DRM 334 matches, or correlates, new resource requests with resource sets available for re-use from previous sessions. More specifically, the DRM 334 uses resource descriptors and the resource descriptor attributes (the data items such as bit rate) of the resource descriptors and matches one or more of the attributes of the resource descriptors of the new session with a re-usable session. Further information on resource descriptors and existing session set-up protocol for connection oriented data communications, such as DSM-CC, can be found in ISO/IEC 13818-6:1998, and Session Protocol by Time Warner Cable, Version 1.0, Jun. 10, 1999, both herein incorporated by reference. Also included with in the DNCS 323 is a QAM manager 336, which is used to provide an interface for communications between the DNCS 323 and a QAM of the service (or QAM) groups 324.

A service application manager (SAM) server 325 is a server component of a client-server pair of components, with the client component being located at the DHCT 16 (FIG. 4). Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary.

Applications on both the headend 11 and the DHCT 16 (FIG. 4) can access the data stored in a broadcast file system (BFS) server 328 in a similar manner to a file system found on operating systems. The BFS server 328 is a part of a broadcast file system that has a counterpart BFS client module 443 (FIG. 4) in a DHCT 16 connected to the network 18. The BFS server 328 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 321 is responsible for managing the content on the video pumps 311 of the VOD content servers 322. The MOD server application 319 controls both the VOD content manager 321 and the VOD content servers 322 and utilizes them to help deliver the video and audio streams that make up VOD services. In one embodiment, a MOD content manager and MOD content servers (not shown) could run respectively in parallel to the VOD content manager 321 and VOD content servers 322 to manage other types of on-demand media content. In an alternate embodiment a MOD content manager replaces the VOD content manager 321 and the MOD content servers replaces the VOD content servers 322. The QAM modulators that comprise the QAM group 324 receive the MPEG-2 transport streams from the VOD content servers 322, convert them into encrypted RF signals at a specified frequency (channel), and transmit them to a DHCT 16 (FIG. 4) via the network 18.

The QPSK modem 326 is responsible for transporting the out-of-band Internet protocol (IP) datagram traffic between the distribution headend 11 and a DHCT 16 (FIG. 4). Data from the QPSK modem 326 is routed by a headend router 327 within the headend 11. The headend router 327 is also responsible for delivering upstream application traffic to the various application servers, for example application servers 319 and 320.

A transaction encryption device (TED) 350 is a special-purpose processor. The DNCS 323 employs the TED 350, in one embodiment, to create an interactive session key (ISK). For example, in asymmetric cryptography, the DNCS 323 supplies templates for each of two Entitlement Management Messages (EMM) (i.e., one used for the QAM of the QAM group 324 (herein, QAM) and the other used for the DHCT 16) as well as public keys for the QAMs and the DHCT 16. The TED 350 preferably generates a triple-DES cryptographic key that will be used as the ISK. The TED 350 inserts this key in each EMM, then encrypts each EMM using the public key appropriate for the EMM's destination. The TED 350 returns the two resulting encrypted EMMs to the DNCS 323. The DNCS 323 sends the EMMs to the QAM and the DHCT 16. The QAM receives its EMM, decrypts the EMM using its private key, and extracts the triple-DES ISK. The QAM then proceeds to generate a stream of single-DES keys and uses each, in turn, to encrypt a portion of the session in question. At substantially the same time, the QAM inserts each single-DES key into an Entitlement Control Message (ECM), encrypts the ECM using the ISK, and inserts the encrypted ECM in the video stream along with the encrypted video. The DHCT 16 decrypts its EMM using its private key, extracts the ISK, and uses the ISK to decrypt the ECMs. In this way, it acquires the single-DES keys used by the QAM when encrypting the media content. In addition, there are markers in the encrypted video stream indicating when the QAM switched between single-DES keys. Note that in other embodiments, the functionality of the TED 350 can be implemented through software, such as the software of the DNCS 323.

FIG. 4 is a block diagram illustration of a non-limiting example DHCT 16 that is coupled to a headend 11 and to a television 441, in accordance with one embodiment of the invention. It will be understood that the DHCT 16 shown in FIG. 4 is merely illustrative and should not be construed as implying any limitations upon the scope of the preferred embodiments of the invention. For example, some of the functionality performed by applications executed in the DHCT 16 (such as an MOD application 463) may instead be performed completely or in part at the headend 11 and vice versa, or not at all in some embodiments. A DHCT 16 is typically situated at the residence or place of business of a user and may be a stand-alone unit or integrated into another device such as, for example, a television set or a personal computer or other display devices, or an audio device. The DHCT 16 preferably includes a communications interface 442 for receiving signals (video, audio and/or other data) from the headend 11 through the network 18 and for providing any reverse information to the headend 11 through the network 18.

The DHCT 16 further preferably includes one or more processors, such as a processor 444, for controlling operations of the DHCT 16, an output system 448 for driving the television display 441, and at least one tuner system 445 for tuning into a particular television channel or frequency to display media content and for sending and receiving various types of data or media content to and from the headend 11. The DHCT 16 may include, in other embodiments, multiple tuners for receiving downloaded (or transmitted) media content. The tuner system 445 can select from a plurality of transmission signals (FIG. 2) provided by the subscriber television system. The tuner system 445 enables the DHCT 16 to tune to downstream media and data transmissions, thereby allowing a user to receive digital or analog media content delivered in the downstream transmission via the subscriber television system. The tuner system 445 includes, in one implementation, an out-of-band tuner for bi-directional QPSK data communication and one or more QAM tuners (in band) for receiving television signals. Additionally, a receiver 446 receives externally generated information, such as user inputs or commands from an input device, such as a remote control device 480, or other devices.

According to another embodiment of the invention, a telephone modem (not shown) in the DHCT 16 can be utilized for upstream data transmission and a headend 11, hub 12 (FIG. 1) or other component located upstream in the STS 10 (FIG. 1) can receive data from a telephone network corresponding with the telephone modem and can route the upstream data to a destination internal or external to the STS 10, such as an application data server in the headend 11 or a content provider.

The DHCT 16 may also include one or more wireless or wired interfaces, also called communication ports (not shown), for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons, or the user inputs may be aural.

The DHCT 16 can include one or more storage devices (not shown), preferably integrated into the DHCT 16 through an integrated drive electronics (IDE) or small computer system interface (SCSI), or externally coupled to the DHCT 16 via one of the communication ports described above. The storage device can be optical, among other technologies, but is preferably a hard disk drive.

In one implementation, the DHCT 16 includes system memory 449, which includes FLASH memory 451 and dynamic random access memory (DRAM) 452, for storing various applications, modules and data for execution and use by the processor 444. Basic functionality of the DHCT 16 is provided by an operating system 453 that is preferably stored in FLASH memory 451. Among other things, the operating system 453 includes at least one resource manager 467 that provides an interface to resources of the DHCT 16 such as, for example, computing resources.

One or more programmed software applications, herein referred to as applications, are executed by utilizing the computing resources in the DHCT 16. Note that an application typically includes a client part and a server counterpart that cooperate to provide the complete functionality of the application. The applications may be resident in FLASH memory 451 or downloaded (or uploaded) into DRAM 452. Applications stored in FLASH memory 451 or DRAM 452 are executed by the processor 444 (e.g., a central processing unit or digital signal processor) under the auspices of the operating system 453. Data required as input by an application is stored in DRAM 452 or FLASH memory 451 and read by the processor 444 as need be during the course of the application's execution. Input data may be data stored in DRAM 452 by a secondary application or other source, either internal or external to the DHCT 16, or possibly anticipated by the application and thus created with the application at the time it was generated as a software application, in which case it is stored in FLASH memory 451. Data generated by an application is stored in DRAM 452 by the processor 444 during the course of the application's execution. DRAM 452 also includes application memory 470 that various applications may use for storing and/or retrieving data.

An application referred to as a navigator 455 is also resident in FLASH memory 451. The navigator 455 provides a navigation framework for services provided by the DHCT 16. The navigator 455 preferably handles channel navigation keys on the remote control device 480. It also preferably displays a channel banner with information about the selected channel. The navigator 455 registers for and in some cases reserves certain user inputs related to navigational keys such as channel increment/decrement, last channel, favorite channel, etc. The navigator 455 also provides users with television related menu options that correspond to DHCT functions such as, for example, blocking a channel or a group of channels from being displayed in a channel menu.

The FLASH memory 451 also contains a platform library 456. The platform library 456 is a collection of utilities useful to applications, such as a timer manager, a compression manager, a configuration manager, a hyper-text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 456 that are shown in FIG. 4 are a window manager 459 and a service application manager (SAM) client 457. The window manager 459 provides a mechanism for implementing the sharing of the display device screen regions and user input. The window manager 459 on the DHCT 16 is responsible for, as directed by one or more applications, implementing the creation, display, and de-allocation of the limited DHCT 16 screen resources. It allows multiple applications to share the screen by assigning ownership of screen regions, or windows.

The window manager 459 also maintains, among other things, a user input registry 450 in DRAM 452 so that when a user enters a key or a command via the remote control device 480 or another input device such as a keyboard or mouse, the user input registry 450 is accessed to determine which of various applications running on the DHCT 16 should receive data corresponding to the input key and in which order. As an application is executed, it registers a request to receive certain user input keys or commands, also called events. Events are the typical manner of communication between the operating system 453 and applications. When the user presses a key corresponding to one of the commands on the remote control device 480, the command is received by the receiver 446 and relayed to the processor 444. The processor 444 dispatches the event to the operating system 453 where it is forwarded to the window manager 459 which ultimately accesses the user input registry 450 and routes data corresponding to the incoming command to the appropriate application.

The SAM application 457 is a client component of a client-server pair of components, with the server component being located on the headend 11, typically in the DNCS 323 (FIG. 3). A SAM database 460 (i.e., structured data such as a database or data structure) in DRAM 452 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 462), pay-per-view events (available through a PPV application 464), digital music (not shown), media-on-demand (available through an MOD application 463), and an electronic program guide (EPG) (available through an EPG application 477). In general, the identification of a service includes the identification of an executable application that provides the service along with a set of application-dependent parameters that indicate to the application the service to be provided. For example, a service of presenting a television program could be executed by the WatchTV application 462 with a set of parameters to view HBO or with a separate set of parameters to view CNN. Each association of the application component (tune video) and one parameter component (HBO or CNN) represents a particular service that has a unique service I.D. The SAM application 457 also interfaces with the resource manager 467 to control resources of the DHCT 16.

Applications can also be downloaded into DRAM 452 at the request of the SAM application 457, typically in response to a request by the user or in response to a message from the headend 11. In the example DHCT 16 depicted in FIG. 4, DRAM 452 contains a media-on-demand application (MOD) 463, an e-mail application 465, an electronic program guide application 477, and a web browser application 466. It should be clear to one with ordinary skill in the art that these applications are not limiting and merely serve as examples for this present embodiment of the invention. Furthermore, one or more DRAM based applications may, as an alternative embodiment, be resident in FLASH memory 451. These applications, and others provided by the cable system operator, are top level software entities on the network for providing services to the user.

In one implementation, applications executing on the DHCT 16 work with the navigator 455 by abiding by several guidelines. First, an application utilizes the SAM application 457 for the provision, activation, and suspension of services. Second, an application shares DHCT 16 resources with other applications and abides by the resource management policies of the SAM application 457, the operating system 453, and the DHCT 16. Third, an application handles situations where resources are only available with navigator 455 intervention. Fourth, when an application loses service authorization while providing a service, the application suspends the service via the SAM (the navigator 455 will reactivate an individual service application when it later becomes authorized). Finally, an application is designed to not have access to certain user input keys reserved by the navigator (i.e., power, channel +/−, volume +/−, etc.).

The MOD application 463, in providing its service, engages in a direct two-way IP connection with the VOD content server 322 (FIG. 3). The MOD application server 319 (FIG. 3) is responsible for providing configuration and service data to the MOD application 463, such as the catalog of titles available for purchase and/or rental by the user. The MOD service may be activated when the user tunes to the MOD service. The user may access the MOD channel in a variety of ways, such as by accessing by direct channel number entry, as one example.

Preferably, when the user tunes to the MOD channel, the navigator 455 asks the SAM 457 for the service mapped to the channel, which is a service provided by the MOD application 463. The navigator 455 then uses the SAM 457 to activate the MOD service. If the MOD application 463 is not resident in the memory of the DHCT 16, the SAM 457 uses facilities of the operating system to download the MOD application 463 using the BFS client 443. Once loaded in DHCT 16 memory, the MOD application 463 is executed. An activate service event is then delivered to the MOD application 463. Contained in the event is the parameter data defined for the service by the MOD application server 319 (FIG. 3) when it was provisioned by the system operator. The parameter preferably includes the URL for the MOD catalog on the BFS 328 (FIG. 3), the IP address and port of the MOD application server 319, and other system operator configurable parameters such as the initial browse-by category to display the catalog screen, a trailer channel to tune upon activation, etc.

The first time the MOD application 463 is activated, it connects to the MOD application server 319 (FIG. 3) and retrieves information about the user. The MOD application 463 opens a User Datagram Protocol (UDP) socket and sends the MOD application server 319 a request for current user information. The request includes a Media Access Control (MAC) address uniquely identifying the DHCT 16, and thus identifying the user. The MOD application server 319 then returns the requested user information, including but not limited to current rental information and user configuration information. This information has been stored in the MOD application server 319 database previously based on the MOD application 463 creating VOD sessions and from commands from the MOD application 463 over a UDP socket to store user configuration information.

The titles presented in the MOD title catalog screen (not shown) that are grouped in the various title categories are arranged by a system operator through an interface (not shown) at the headend 11. The interface is provided by the MOD application server 319 (FIG. 3). The interface enables the system operator to configure separate catalogs and also the various title categories within each catalog. Mapping of titles to category is 1:N, and can be defined by the system operator via a MOD application server graphical user interface (GUI) (not shown).

Whenever a catalog or title category is updated or created, the catalog manager (not shown) of the MOD application server 319 (FIG. 3) generates and updates the catalog file(s) using the BFS server 328 (FIG. 3). As described above the BFS server 328 is in constant communication with a BFS client 443 in the DHCT 16 to provide updates and new applications to the DHCTs 16 in the subscriber television system 10 (FIG. 1).

To provide the MOD service to the user, the MOD application 463 preferably interacts with the VOD content server 322 (FIG. 3) and other elements in the headend 11 to establish a DSM-CC session. Previous control systems implemented each DSM-CC session (herein session(s)) requests quite literally. When a client or server requested a new session, the control system created one. When asked to release a session, the control system freed all network resources associated with the session. However, the preferred embodiments of the present invention include optional session re-use. As described above, a session will be understood to mean the allocation and arrangement (i.e., establishment) of hardware and/or software resources in the headend 11 and/or hub 12 (FIG. 1) or elsewhere in the subscriber television system to provide media content to one or more DHCTs. Session creation, maintenance, and termination (for connection oriented media content delivery) are largely dictated by the DSM-CC protocol. The DNCS 323 implements session setup and release preferably through two DNCS session manager components, or modules: the Digital Session Manager (DSM) 335 and the Digital Resource Manager (DRM) 334. The DSM 335 is responsible for implementing the DSM-CC session signaling protocol, whereas the DRM 334 arranges network resources (for example, headend hardware and/or software and encryption configuration) in support of sessions. Sessions for video on demand, IP, standing broadcast services, BFS data carousels, application-specific data carousels, audio-on-demand, and others, are similarly structured, and generally differ in the types of resources that are used. In the examples that follow, sessions will be described for video on demand (VOD), with the understanding that the same or similar mechanisms can be applied for IP and other session-based infrastructures, as well as other types of media on demand, as will be appreciated, in the context of the description herein, by one having ordinary skill in the art.

Any process descriptions or blocks in the flow charts and/or flow diagrams that follow should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art.

Figure 5B:
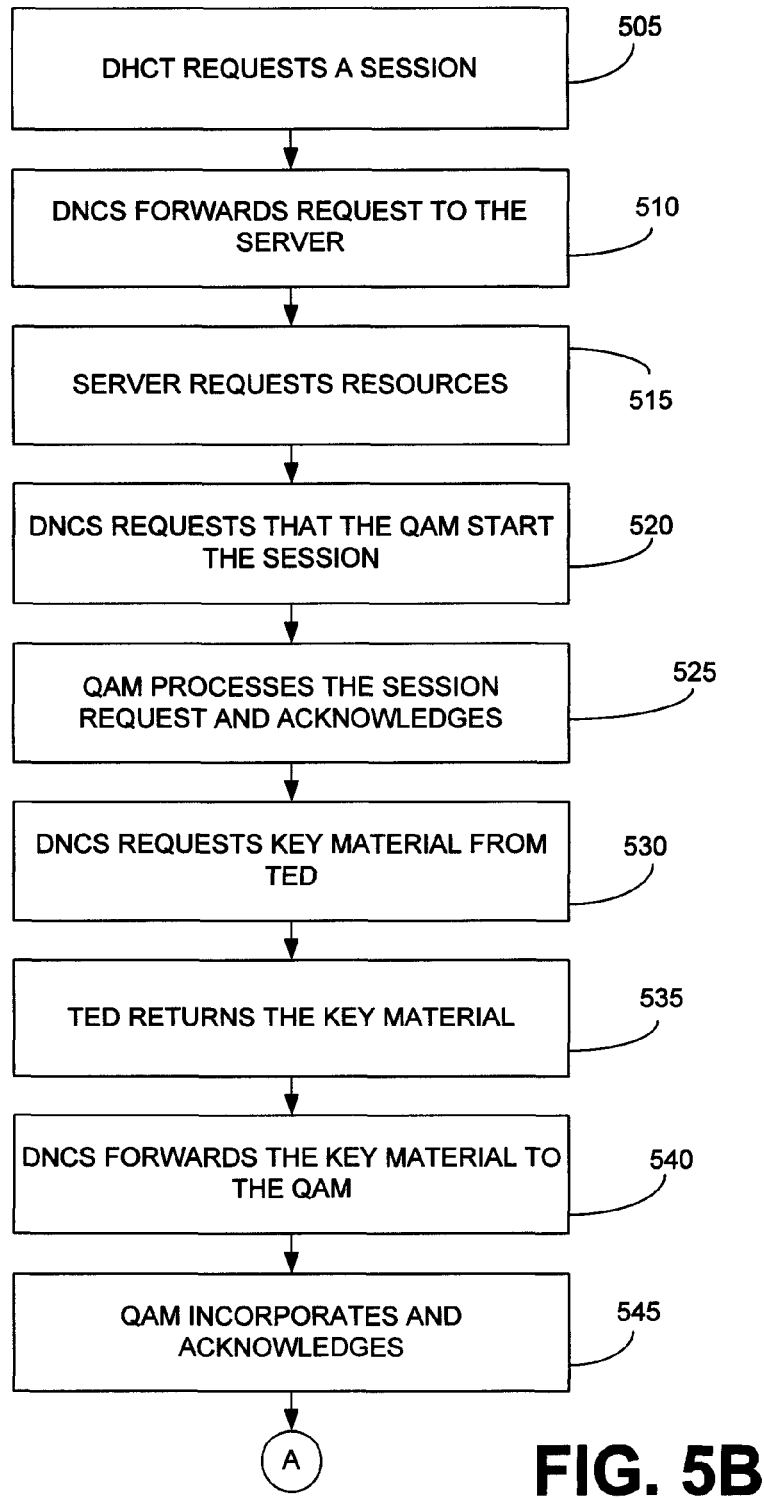
FIGS. 5B and 5C are flow charts describing the signaling interactions illustrated in FIG. 5A for establishing a VOD session, in accordance with one embodiment of the invention.
Figure 5C:
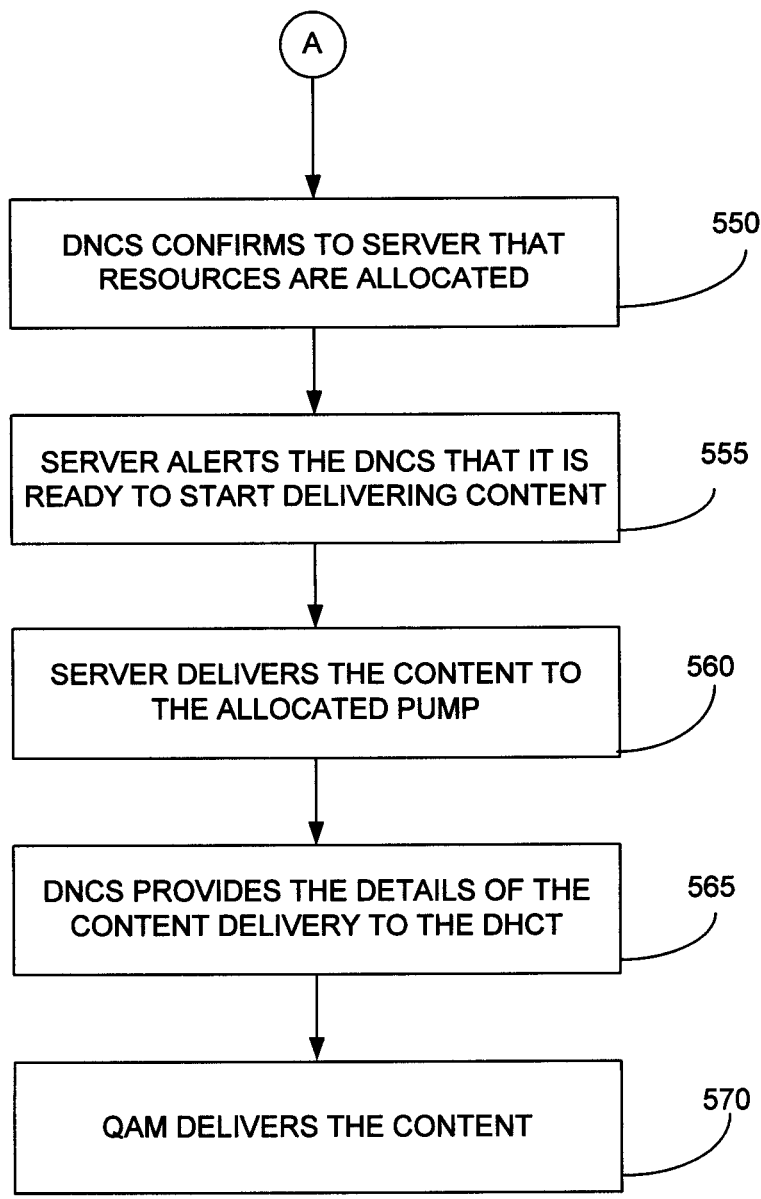

FIG. 5A is a block diagram generally illustrating the signaling interactions between the relevant components of the headend 11 (FIG. 3), and FIGS. 5B and 5C are flowcharts of the interactions depicted in FIG. 5A. Further description on session creation can be found in patent application entitled, "CATALOG MANAGEMENT SYSTEM FOR VIDEO ON DEMAND SYSTEM", filed Jun. 9, 2000, having Ser. No. 09/590,518, assigned to Scientific Atlanta, Inc., and which is entirely incorporated herein by reference. Starting at Step 505 in FIG. 5B, and with continued reference to FIG. 5A, the DHCT 16 begins with a session request to the DNCS 323, typically via a QPSK (out of band) signal. For example, the session request by the DHCT 16 in step 505 can be for a VOD session, and the "requester" in the DHCT 16 can be the MOD application 463. The session request usually happens after the MOD application 463 has enabled the user to select a title that the user wishes to rent or purchase. The session request will have enough embedded information, in part dictated by DSM-CC, to enable the addressed server to make a determination as to what resources are required to deliver the content. The DSM-CC protocol also includes sufficient addressing for the DNCS 323 to make session routing decisions. For example, the DSM-CC request carries, in a DSM-CC mandated header, the addresses of both the VOD content server 322 and the DHCT 16. These are addresses interpreted by the DNCS 323 and available to the client and server resident applications. The user-to-user data can have further addressing information (e.g., identifying the DHCT client, the MOD server, and providing a session identifier) specific to the MOD application 463. In one embodiment, the user-to-user data are left unread by the DNCS 323.

Step 510 provides that the DNCS 323 forwards the request to the VOD content server 322 in the form of a session indication. In one embodiment, the DNCS 323 does not interpret the user-to-user data, but instead just forwards the request to the VOD content server 322. In other embodiments, the DNCS 323 performs some decision processing functionality, such as load balancing servers, matching proprietary devices (e.g., remote server to DHCT), and selection of communication terminals to optimize signal strength, among other functions.

After the VOD content server 322 receives the session indication, it interprets the request and makes a determination as to whether it can supply the requested movie. The VOD content server 322 also determines the resources and resource parameters (herein collectively referred to as resources) necessary to fulfill the session request. These resources can include the QAMs of the QAM group 324 (FIG. 3) (herein, QAM or QAMs), video pumps (and/or corresponding input transport stream identification (TSID)), MPEG input and/or output program numbers, encryption, data rates, the audio/video configuration (e.g., one video, 2 audio, stereo or mono) or elementary streams, and the signaling path between the VOD content server 322 and the DHCT 16 for bi-directional communication. Further, in some implementations, the VOD content server 322 can determine if the request is for content that is authorized for access by the requester (i.e., the DHCT 16 user), such as parental control personal identification numbers.

In some implementations, the VOD content server 322 can be in communications with a separate billing entity that determines the issue of authorized access and other billing issues. Also, in some implementations, the VOD content server 322 will have a table (not shown) that will correlate groups of users to particular QAMs (or input TSID's). In other implementations, the VOD content server 322 can provide a list of input TSID's for QAMs that can illuminate a requesting DHCT 16, and the DNCS 323 can decide the most acceptable input TSID of these choices. In some embodiments, the DNCS 323 may send the DHCT 16 a session proceeding indicating message (not shown) to alert the DHCT 16 that the session request is being processed.

If the VOD content server 322 determines that it can deliver the service, it sends back a resource request to the DNCS 323 to reserve and arrange the network resources to deliver the service (Step 515).

Resource descriptors are used to define the resources that are allocated to a session. An interactive session preferably has two resource "views." The VOD content server 322 resource descriptor view (i.e., server view) defines the resources that are used to deliver the service from VOD content server 322 into the network 18 (FIG. 1). The MOD application 463 resource descriptor view (i.e., client view) defines resources that are used in order for the DHCT 16 to receive the service from the network 18. The descriptors have the same format, and in large part have the same content, but typically different data. For example, the TSDownstreamBandwidth descriptor in the server view includes the ID for the stream (i.e., TSID) from the VOD content server 322 to the network 18 at the server side of the QAM. In the client view, the TSID is the ID for the modulated output from the QAM modulator (i.e., the client side of the QAM).

For the VOD content server 322 resource descriptor view, several resource descriptors are used, including TSDownstreamBandwidth, MPEGProgram, as well as two other resource descriptors (ServerConditionalAccess and HeadEndID) that will be described below in association with FIG. 9. The TSDownstreamBandwidth resource descriptor contains a transport stream ID field and a bandwidth field. The transport stream ID identifies the physical connection from the VOD content server 322 to the network 18 (FIG. 1), as described above. This transport stream ID is typically assigned by a network operator when a new connection is installed. The DNCS 323 preferably maintains a table of input TSID's (i.e., the output of a particular video pump) to a corresponding QAM. A TSID is unique to a particular video pump (and thus to a particular QAM port). The bandwidth field identifies, in bits per second, the amount of bandwidth to deliver a service. This amount of bandwidth will be reserved in the network 18 (e.g., by the DNCS 323 communicating to a QAM the minimum required bandwidth, from which the QAM can adhere strictly to, in some implementations, or treat as advisory in other implementations) for the duration of the VOD session with the DHCT 16 that requests the service.

The MPEGProgram resource descriptor is another VOD content server 322 resource descriptor. This resource descriptor identifies the MPEG program number that is carrying the service and is passed by the DNCS 323 to the QAM, which in one implementation, picks the media content instance associated with the program number from the input transport stream and passes it to the QAM output for delivery to a requesting DHCT 16.

The second resource view of an interactive session is the MOD application 463 resource descriptor view (i.e., client view). This view is used for all services that use MPEG to deliver the downstream data. The resource descriptor, "TSDownstreamBandwidth," contains a transport stream ID field and a bandwidth field. The transport stream ID identifies the QAM modulator in service group 324 (FIG. 3) that is transmitting a service. In one implementation, the transport stream ID is assigned by a network operator (not shown) when a new QAM 324 is installed.

The bandwidth field identifies, in bits per second, the bandwidth at which a service will be delivered. The MPEGProgram resource descriptor identifies the MPEG program number that is carrying the service. This resource descriptor is used by the DHCT 16 to determine which media content instance from a transport stream identified by the TSDownstreamBandwidth resource to decode. As with the server view, the client view also includes the HeadEndID descriptors and a ClientConditionalAccess descriptor, as described below.

In Step 520, the DNCS 323 requests that the identified QAM start a session. This request includes directing the QAM to start a session with a particular input TSID. In general, the DNCS 323 (and cooperating hardware and/or software) takes an MPEG program from a transport stream (coming from the VOD content server 322) and ensures that the MPEG program (with program number or elementary stream PIDs potentially remapped) is modulated by a modulator whose output can be read by a client device (i.e., DHCT 16). When setting a session on a QAM, the DNCS 323 communicates to the QAM both an input port and an output port. Each port maps one-to-one to a TSID. The output port also has a frequency, which was established when the QAM first started in the network 18 (FIG. 1). In asynchronous serial interface (ASI) and asynchronous transfer mode (ATM) input scenarios, the DNCS 323 communicates the input MPEG program number to the QAM. In response to the request by the DNCS 323 to start a session, the QAM returns an acknowledgement that the session has started (Step 525).

Continuing with the flowchart of FIG. 5B and the flow diagram of FIG. 5A, the DNCS 323, in response to the acknowledgement (525), requests an interactive session key (ISK) from the transaction encryption device (TED) 350, according to Step 530. The ISK is used in a similar way that the key to an entitlement management message (EMM) is used in broadcast encryption. The TED 350 forwards the ISK to the DNCS 323 (Step 535), which then forwards the ISK to the QAM (Step 540). The QAM repeatedly generates keys used to encrypt the media content. The QAM then encrypts these keys using the ISK, thereby creating entitlement control messages (ECMs), which are transmitted with the media content. The DHCT 16 receives the ISK via a client-view resource descriptor (e.g., the ClientConditionalAccess resource descriptor) included in the session confirmation (Step 565, described below). The DHCT 16, having received the ISK via the VOD session signaling, uses the ISK to decrypt the ECMs. The DHCT 16 then extracts the content keys from the ECMs and uses them to decrypt the elementary streams.

Referring to FIG. 5C, with continued reference to FIG. 5A, Step 550 provides that the DNCS 323 sends a resource confirmation to the VOD content server 322 to confirm that the resources requested by the VOD content server 322 have been established. In some implementations, the DNCS 323 can have discretion as to what input TSID of several available TSID's listed by the VOD content server 322 to choose from, and thus the resource confirmation can include an identification of what TSID was used. In Step 555, the VOD content server 322 sends to the DNCS 323 a session response accepting what has been done, and the VOD content server 322 starts delivering the requested media content to the allocated video pump (Step 560).

Step 565 provides that the DNCS 323 forwards the information of the session response to the DHCT 16 in a session confirmation. The information in the session confirmation includes specifics about the resources set-up by the DNCS 323, including what frequency the DHCT 16 must tune to, the output MPEG program number (output from the QAM) the DHCT 16 must select to retrieve the requested on-demand media content instance, and the ISK message from which the DHCT extracts the ISK to decrypt the encrypted media content, as described above.

Finally, the QAM delivers the requested media content to the DHCT 16 (Step 570), encrypting as media content is passed through the QAM from the video pump. Although this media content is delivered over a dedicated session, it is carried on a transport stream in MPEG packets over the defined carrier frequency from the QAM. The transport stream, due to the nature of MPEG, can be carrying a plurality of on-demand media content instances via VOD sessions to other users.

Other signaling supported by the network infrastructure is a periodic "keep-alive" between the DNCS 323 and the DHCT 16. The DHCT 16 periodically sends a ClientSessionInProgress message (not shown), which lists the sessions currently terminating at the DHCT 16. The primary purpose is for the DNCS 323 to detect when a DHCT 16 powers off or reboots. The DNCS 323 keeps a transmission control protocol (TCP) connection open to each server, and synchronizes when it loses that connection. In some embodiments, a ServerSessionInProgress message as defined by DSM-CC can similarly be used for detection of loss of power or reboots.

The DHCT 16 can initiate a regular VOD session tear down. The regular session teardown includes the release of the network resources used to provide a VOD session. The release of the network resources enables the initiation of a new VOD session. FIG. 6A is a schematic diagram of the signaling interactions between network resources for tearing down a session using a client initiated session release. A session that is active on that particular DHCT 16 may be torn down by the DCHT 16. The relevant network resources include the DHCT 16, the VOD content server 322, the DNCS (broken down into component parts that include the DSM 335, the DRM 334, and the QAM manager 336), and the QAM 324a of service (or QAM) group 324. To initiate this process, the DHCT 16 sends a MOD application release request 610 to the DSM 335. The DHCT 16 typically sends the client release request 610 after it has stopped using all resources for a session that it is attempting to tear down. The DSM 335 forwards the request to the DRM 334 (Step 615), and the DRM 334 sends a delete session request 620 to the QAM manager 336, which requests that the QAM 324a delete the session (Step 625). The QAM 324a responds with a confirmation to the QAM manager 336 (Step 630). The QAM manager 336 confirms to the DRM 334 that the session is deleted (Step 635), and the DRM responds to the DSM 335 with a Release Rsrs Done message (Step 640). The DSM 335 also, upon receiving the client release request 610, initiates a VOD server release indication 645 to the VOD content server 322. The VOD content server 322 responds with a server release response 650 to the DSM 335 which is then passed to the DHCT 16 in the form of a VOD client release confirm message 655. The DNCS 323 (through the DRM 334 and DSM 335 and QAM Manager 336) preferably releases the resources provided for the session before the receipt of the VOD server release response 650 from the VOD content server 322.

A regular session tear down may also be initiated by the VOD content server 322. FIG. 6B is a schematic diagram 627 of the process for a VOD content server 322 to initiate a tear down session. Note that the DNCS 323 is not broken down into component elements for ease of discussion. The VOD content server 322 issues a server release request 629 to the DNCS 323 after it has stopped using all resources for a particular session that it is attempting to tear down. The DNCS 323 initiates a client release indication message 631 to the MOD application 463 (FIG. 4) on the DHCT 16 which is responded to in the form of a client release response 633. The DNCS 323 then initiates a server release confirm message 634 to the VOD content server 322 that initiated the tear down. The DNCS 323 preferably releases the resources for the VOD session before the client release response message 633 is received by the DNCS 323.

A regular VOD session tear down may also be initiated by the DNCS 323. Again, as with FIG. 6B, the DNCS 323 is not broken down into component elements for ease of discussion. FIG. 6C is a schematic diagram 640 of the DNCS 323 initiated session tear down. The DNCS 323 initiates a server release indication message 642 to the VOD content server 322 providing the VOD session. The DNCS 323 may also simultaneously send the client release indication message 644 to the DHCT 16 notifying the DHCT 16 of the tear down sequence. The VOD content server 322 that received the server release indication message 642 responds by a server release response message 646, and the DHCT 16 responds to the client release indication message 644 with a client release response message 648. The resource attributed or assigned to the VOD session is preferably released before both the client release response message 648 and the server release response message 646 is received by the DNCS 323.

The VOD content server 322 (FIG. 3) preferably provides an applications programming interface (API) (not shown) by which the application servers can register interest in session setup and tear down events. Information describing these events is sent to registered application servers and include the session ID and the user (application) data contained in the session setup request, such as the MAC address of the DHCT 16, the title ID, and the rental option in the case of the MOD application. In this way the MOD application server 319 (FIG. 3) can be notified when a VOD session is established with the VOD content server 322 by the MOD application 463 (FIG. 4). Additionally, the MOD application server 319 may use the API to request that the VOD content server 322 tear down the session if the user of the DHCT 16 is not authorized for the MOD service for billing reasons.

Session setup and release are typically costly insofar as they require communication with headend hardware and encryption devices. Individual VOD servers tend to serve content of a single type, resulting in session resource requests that, typically, seldom vary. For example, a single server that delivers VOD media content tends to request the same data rate for all of the sessions that it serves. The preferred embodiments preserve settings on headend hardware across sessions, requiring less communication with that hardware. The preferred embodiment will release network resources when necessary, and will re-use hardware setups whenever possible, as described below. Other embodiments release and re-use to a lesser extent. This is best illustrated by first showing changes to session release, as illustrated by the schematic diagram in FIG. 7. FIG. 7 is similar to the illustration of session termination depicted in FIG. 6A, but with a description that is limited to the relevant resources for re-using sessions. As described above, the DHCT 16 issues a VOD client release request to the DSM 335 (Step 710). The DSM 335 communicates this request to the DRM 334 (Step 720). When asked to release session resources, the DRM 334 will hold the session for re-use (Step 730) rather than instruct the headend hardware and/or software to release the session. The DSM 335 replies to the DHCT 16 with a confirmation that the resource release has been initiated (Step 740), with a later confirmation to the DHCT 16 when the resource release has been completed. The DSM 335 forwards the VOD client release to the VOD content server 322 in the form of a VOD server release indication (Step 750). The VOD server 322 responds with a VOD server release response (Step 760). The DRM 334 then responds to the DSM 335 with a confirmation that resources have been released (Step 770), even though the resources are indeed being saved for re-use. In one implementation, the duration that the resources can be saved for re-use can be operator configurable.

Subsequently, the saved session may be used to satisfy a new session request, as shown in FIG. 8. FIG. 8 is a schematic diagram illustrating how sessions are re-used to satisfy resource requests. The steps shown in this display diagram prior to the allocation of network resources are similar to the steps followed in the session set-up as described in the flow diagram of FIG. 5A, except the interactions between the DSM 335 and DRM 334 modules of the DNCS 323 are illustrated, and the resources are re-used, in accordance with the preferred embodiment. Step 810 provides that the DHCT 16 requests a VOD session to the DSM 335 of the DNCS 323.

The DSM 335, in Step 820, forwards that request to the VOD content server 322 in the form of a session indication. The VOD content server 322 determines if it can supply the requested on-demand media content instance, and then submits its resource requirements to the DSM 335 (Step 830). In Step 840, the DSM 335 forwards this request to the DRM 334.

Step 850 provides that the DRM 334 finds re-usable session resources. Once the DRM 334 has session information available for re-use, it can satisfy resource requests using pre-existing resource sets from previous sessions. In a preferred embodiment, the DRM 334 evaluates one or more resource descriptor attributes to make the determination as to whether resources match. For example, the DRM 334 can ensure that the session to be re-used will match the bit rate required by the new session. In one embodiment, the DRM 334 ensures that the bit rate of the re-used session is at least enough to satisfy the bit rate required for the new session. The DRM 334 can also evaluate whether encryption is required in the new session, and whether the re-usable sessions are configured for encryption. Another possible evaluation can include determining the constraints of the available video pumps 311 (FIG. 3), for example what MPEG program numbers are requested for the new session and what MPEG program numbers can be generated by the available video pumps 311. From that point, the DRM 334 can inform the DSM 335 that resources are allocated for the requested session (Step 860), and the DSM 335 can forward that message in a confirmation to the VOD content server 322 (Step 865). Following from there is a resource response (Step 870) and session confirmation (Step 875).

Thus, in the preferred embodiment, one or more of steps 520-545 (FIG. 5A and FIG. 5B) that occur during the initial session set-up can be eliminated for subsequent sessions to reduce the time and resources required to tear down and re-create sessions. As an illustrative example, assume the session for a first DHCT 16 has ended, and a session for a second DHCT 16 is requested. If the prior session for the first DHCT 16 included Lethal Weapon on MPEG program number 473, then Out of Africa, as requested by the second DHCT 16, is inserted in MPEG program number 473 in the same input transport stream ID, using the same QAM ports and thus the same output transport stream ID, without going through steps 520-545.

FIG. 9 is a block diagram illustrating partial views of a table of transport stream ID's and a session table, in accordance with one embodiment of the invention. The list of transport stream ID's can be maintained in a table separate from the session table, or the tables can be combined in other embodiments. These tables are preferably maintained in the DNCS 323 (FIG. 3) by the DRM 334, but in other embodiments, can be maintained at other locations such as in the VOD content server 322 (FIG. 3), or at application servers, among other locations and other devices. The output TSID table 910 provides a list of output TSID's that can be used to index sessions ready for re-use. The resource descriptors and attributes likely to change between sessions include Downstream bandwidth, Input MPEG program number, Output transport stream ID, and Encryption. The output transport stream ID identifies a particular QAM modulator carrying the session. Individual QAM modulators can typically carry a small number of sessions simultaneously. Therefore, the output transport stream ID is useful for indexing sessions that are ready for re-use. From the TSID table 910, the DRM 334 can access the session table (e.g., via a memory pointer, as one example) 920. The session table 920, as indicated above, provides a list of sessions that are ready for re-use, as well as sessions that are currently in use. For sessions that are currently in use, the session table 920 can include entries as required by DSM-CC, including a session key entry (not shown) that includes the hardware address, which is typically a three-part integer value that includes the MAC address of the requester, the time of day, and date. In other embodiments, the time of day and date can be substituted with a randomly generated number.

From the session table 920, the DRM 334 can access the server view resource descriptors 930 and the client view resource descriptors 940 for comparison between the requested session and the sessions available for re-use, as described below.

In the preferred embodiment, as described above, the DRM 334 correlates new session resource requests with resource sets available for re-use from previous sessions. Resource descriptors and resource descriptor attributes (data items) that are considered in this correlation include TSDownstreamBandwidth 950, MPEGProgram 960, ServerConditionalAccess 970 (and its client view analog, the ClientConditionalAccess 972), and the HeadEndId 980. The TSDownstreamBandwidth 950 includes the downstreamBandwidth field (not shown). The downstreamBandwidth field indicates the data rate in bits per second, which have been allocated to the session for delivery of application data to the DHCT. The TSDownstreamBandwidth 950 descriptor also includes the downstreamTransportID field (not shown), which identifies the TSID through which the session enters the network (i.e., output from the VOD pump).

The MPEGProgram 960 includes the mpegProgramNum field (not shown). This field is used to specify the program number being used to transport the video stream from the server to the network. Either the VOD content server 322 (FIG. 3) or the DNCS 323 (FIG. 3) can select the program number, and it is preferably agreed upon. Preferably, from one session to the next that has the same parameters, the program association table (PAT) will stay the same because the program number will typically stay the same. Thus, when the QAM builds a new PMT, it actually takes an input PMT and changes the PIDs. It may also change the program number because the input program number may be used by a different media content instance at the output, so the output program number may also be changed (e.g., after being remapped at the QAM). The PMT is saved in the QAM memory (not shown), and the QAM continues to send out the same memory location at the output until the DNCS 323 tells it to tear the session down. At that point, the DNCS 323 abandons the entries of the latest PMT, and new entries are created that are almost identical. In other words, the output table is not really destroyed, just modified based on new parameters. Thus, program 4 from one session may still be called program 4 in a succeeding session, thus re-using the parameters but sending different program content (e.g., Out of Africa instead of Lethal Weapon).

The ServerConditionalAccess 970 and ClientConditionalAccess 972 include two fields (not shown): CaSystemId and CopyProtection. The presence of the ServerConditionalAccess 970 descriptor in the resource request indicates that the server wants the session encrypted. The ServerConditionalAccess 970 appears in the server view of a session. The ServerConditionalAccess 970 identifies the clients (i.e., the DHCTs) that should have access to the session. The ClientConditionalAccess 972 appears in the client view of a session, and carries data used by the conditional access system to provide access to the session. For example, in the asymmetric cryptography described above, this resource descriptor carries an EMM that includes the ISK for the session. The CaSystemId shall specify the conditional access system to be used to protect the session. This field may be server assigned or assigned by the DNCS 323. Almost all sessions started in a given system will preferably have the same CaSystemId. The CopyProtection shall specify if copy protection shall be enabled for the asset by the client, and thus is relevant to application functionality.

The HeadEndId 980 includes three fields (not shown): HeadEndFlag, HeadEndId, and TransportStreamId fields. The HeadEndFlag takes one of four values that determine how the remaining fields should be interpreted. In typical use, this flag indicates that the HeadEndId field should be ignored. The HeadEndId field is an OSI NSAP (Open System Interconnection, Netscape Server API) address that is used to specify distribution of a session content to a particular Head End. This form of the resource descriptor is not used for VOD. It is used when starting broadcast sessions, to indicate a portion of the system to which the session should be delivered. The TransportStreamId field is used to identify the terminating transport stream of the connection through the network. The server may use this field to request that a specific QAM modulator carry a session.

As a non-limiting example implementation, upon receiving a request from the DSM 335 (FIG. 3) for resources to satisfy a new session, the DRM 334 (FIG. 3) will first determine whether the session request names a specific QAM modulator. If it does not, the DRM 334 will choose an appropriate QAM modulator for the session. An appropriate QAM modulator can include one or more QAM modulators that can illuminate the DHCT 16 requesting the new session, and/or a QAM modulator that can receive the media content from a particular video pump 311 (FIG. 3). Whether the session request identifies a specific QAM or not, once a QAM modulator has been identified, the DRM 334 will use that modulator's output transport stream ID to index the list of re-usable sessions, looking for a session with one or more matching resource descriptor attributes. If a suitable re-usable session is found, the DRM 334 will use that existing session in response to the DSM 335.

The DRM 334 may succeed in matching resources, in which case the results will be returned to the DSM 335 (FIG. 3). If, on the other hand, the DRM 334 fails to allocate a new session, the DRM 334 will identify whether the failure is due to insufficient resources. If it is, this will indicate that out-of-use but re-usable sessions may be consuming resources needed by the new session. In response, the DRM 334 will release a session from the list of re-usable sessions for the output transport stream ID in question. The selected session will have a downstream bandwidth value at least as large as that for the new session. Upon releasing this unused session, which involves re-configuring hardware devices, the DRM 334 will again attempt to find resources for the new session. Another failure will result in a failure return to the DSM 335. If no such session is found, the DRM 334 will proceed with standard resource processing, attempting to configure devices to support the new session.

A recently released session is likely to be more useful if the VOD content server 322 (FIG. 3) requests a new session with the same downstream bandwidth, MPEG program number, and encryption setting on the same QAM modulator. Encrypted settings can be used to carry content that need not be encrypted. Therefore, the DNCS 323 (FIG. 3) can force encryption on all sessions, ensuring that a resource setup can be used to satisfy both encrypted and un-encrypted session requests. VOD content servers preferably use a single downstream bandwidth for all sessions. Servers will preferably re-use MPEG program numbers, but in some embodiments, can cycle through all MPEG program numbers. It is preferable to allow the DNCS 323 to choose the program number for a VOD session.

The DRM 334 (FIG. 3) takes the responsibility for tracking resources for re-use. Resources of past sessions will preferably be released under two circumstances. First, when a new session requires a combination of resources that can not be satisfied by those used for a previous session, some old resource sets may be released to make room for the new session. Second, resource sets that have been dormant for a time will be released to free otherwise unused assets, thus reducing exposure to problems such as hardware failures.

The ability to ensure sessions can be re-used is provided for via several embodiments. In an ATM embodiment, the elementary streams are provided for, which enable a determination by the VOD content server 322 (FIG. 3) of the video, audio, and/or data configuration required. In the case of embodiments using ASI inputs to the QAM, the MPEG program number is used and it is preferably the responsibility of the QAM to keep the elementary streams apart. For example, in a VOD implementation with MPEG coming in through ASI ports, as long as the data rate is constant, changes in parameters will preferably cause the re-reading of the program specific information table (PSI). Changes in parameters will preferably be monitored by the VOD content server 322, for instance by providing a generation number in the header of a PMT whenever changes are made to the PMT. This change in generation number will preferably cause the QAM to re-read the PMT. A non-limiting example of a change would be MPEG program number. The server may index the media content such that program number 1 is the first media content instance on the VOD content server 322, program number 2 is the second media content instance, etc. However, in some implementations, the QAM may automatically re-number the program numbers (e.g., in ASI implementations) in order to associate the program numbers with a particular session. In other implementations, this re-numbering may not be automatic (e.g., in ATM implementations), thus resulting in a re-mapping of program numbers by the DNCS 323 (FIG. 3), or in some embodiments, the VOD content server 322 (FIG. 3).

The DNCS 323 (FIG. 3) and its modules DRM 334 and DSM 335, among other supporting functionality, can be implemented in hardware, software, firmware, or a combination thereof. In the preferred embodiment(s), the DNCS 323 and its modules DRM 334 and DSM 335 are implemented in software or firmware that is stored in a memory and that is executed by a suitable instruction execution system. If implemented in hardware, as in an alternative embodiment, the DNCS 323 and its modules DRM 334 and DSM 335 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The DNCS 323 (FIG. 3) and its modules DRM 334 (FIG. 3) and DSM 335 (FIG. 3), which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A method, comprising the steps of:
   establishing a first session with a first client device to deliver first content in response to a request for the first session;
   modulating, by a device, the first content onto a predefined carrier frequency for transmission to the first client device according, to a set of resource descriptor attributes, wherein the set of resource descriptor attributes define characteristics of a path through the device to satisfy the request for the first session;
   receiving a request for a second session with a second client device to deliver second content wherein the first and second client devices are different client devices; and
   re-using the first session for the second session, wherein the re-using comprises:
   modulating, by the device, the second content onto the predefined carrier frequency for transmission to the second client device via the path through the device to satisfies the request for the second session;
   wherein the first session is exclusive to the first client until release of the first session for the re-use of the first session by the second client; and
   wherein release of the first session is initiated by the first client, by a digital network control system, or a server.

2. The method of claim 1, wherein receiving the request for the second session comprises receiving information that enables a determination as to resources required to deliver content corresponding to the second session.

3. The method of claim 2, further comprising, responsive to the request for the second session, determining whether the first session can be re-used for the second session.

4. The method of claim 3, wherein re-using the first session for the second session is responsive to determining that the first session can be used for the second session.

5. The method of claim 3, wherein determining comprises correlating another set of resource descriptor attributes corresponding to the second request with the set of resource descriptor attributes corresponding to the first session.

6. The method of claim 5, wherein the set of resource descriptor attributes correspond to hardware resources, software resources, or a combination of both, used to deliver and receive the first content and the second content associated with the first session and the second session, respectively, over a network.

7. The method of claim 5, wherein the set of resource descriptor attributes include bit rate, encryption, transport stream identification, and MPEG program number.

8. The method of claim 1, wherein establishing the first session with the first client device is in conformance to a Digital Storage Media Command and Control protocol.

9. The method of claim 1, wherein the first and second client devices of the plurality of client devices each comprise digital home communication terminal devices (DHCTS) configured to provide digital television services to an end user.

10. A computer readable memory having stored thereon a program executed by a computing device and comprising instructions for implementing the following:
    establishing a first session with a first client device to deliver first content, in response to a request for the first session;
    causing the computing device to modulate the first content onto a predefined carrier frequency for transmission to the first client device according to a set of resource descriptor attributes, wherein the set of resource descriptor attributes define characteristics of a path through the computing device to satisfy the request for the first session;
    receiving a request for a second session with a second client device to delivery second content wherein the first and second client devices are different client devices; and
    re-using the first session for the second session, wherein the re-using comprises: causing the computing device to modulate the second content onto the predefined carrier frequency for transmission to the second client device via the path through the computing device to satisfy the request for the second session;
    wherein the first session is exclusive to the first client until release of the first session for the re-use of the first session by the second client; and
    wherein release of the first session is initiated by the first client, by a digital network control system, or a server.

11. The program of claim 10, wherein the program further comprises instructions for implementing the step of saving hardware settings, software settings, or a combination of both corresponding to the set of resource descriptor attributes for the first session for re-use by the second session.

12. A system comprising:
    a digital network control system connected in a network between a server and a plurality of client devices, the digital network control system being configured to:
    facilitate a transfer of first content from the server to a first client device of the plurality of client devices over the network during a first session in response to a request for the first session;
    modulating, by a device, the first content onto a predefined carrier frequency for transmission to the first client device according to a set of resource descriptor attributes, wherein the set of resource descriptor attributes define characteristics of a path through the device to satisfy the request for the first session;

receive a request for a second session from a second client device of the plurality of client devices wherein the first and second client devices are different client devices; and in response to the request for the second session, establish the second session between the second client device and the server by re-using the first session, wherein the re-using comprises:

modulating, by the device, the second content onto the predefined carrier frequency for transmission to the second client device via the path through the device to satisfy the request for the second session;

wherein the first session is exclusive to the first client until release of the first session for the re-use of the first session by the second client; and wherein release of the first session is initiated by the first client, by the digital network control system, or the server.

13. The system of claim 12, wherein the digital network control system is further configured to facilitate transfer of second contend from the server to the second client device of the plurality of client devices over the network during the second session.

14. The method of claim 13, wherein to establish the second session between the second client device and the server, the digital network control system is further configured to provide the predefined carrier frequency to the second client device, wherein the second content is provided to the second client device on the predefined carrier frequency.

15. The method of claim 14, wherein to establish the second session between the second client device and the server, the digital network control system is further configured to provide an output MPEG program identifier to the second client device, wherein the output MPEG program identifier identifies the second content output at a quadrature amplitude modulator (QAM).

16. The system of claim 12, wherein the digital network control system is further configured to receive a release request for the first session from the first client device of the plurality of client devices, wherein the release request is provided upon the first client device of the plurality of client devices discontinuing use of network resources of the network to receive the first content.

17. The system of claim 16, wherein, in response to receiving the release request, the digital network control system is further configured to:

save at least one of hardware settings and software settings corresponding to the set of network resource descriptor attributes;

provide a first message over the network to the first client device of the plurality of client devices that indicates a release request has been initiated; and provide a second message over the network to the sever that indicates the first client device of the plurality of client devices has initiated the release.

18. The system of claim 12, wherein the digital network control system is further configured to save at least one of hardware settings and software settings corresponding to the set of network resource descriptor attributes in a session table that comprises sessions available for re-use and sessions currently in use.

19. The system of claim 18, wherein, in response to the request for the second session, the digital network control system is further configured to compare at least one of the hardware settings and the software settings corresponding to the second request with the sessions available for re-use listed in the session table.

20. The system of claim 19, wherein, in response to the comparison, the digital network control system is further configured to select at least one of the hardware settings and software settings corresponding to the set of network descriptor attributes for re-use in the second session.

* * * * *